US 8,459,739 B2

(12) United States Patent
Tamanouchi et al.

(10) Patent No.: US 8,459,739 B2
(45) Date of Patent: Jun. 11, 2013

(54) CHILD CAR SEAT

(75) Inventors: Takeshi Tamanouchi, Saitama (JP);
Toru Miyachi, Saitama (JP); Hirohisa Suzuki, Saitama (JP); Isao Yamaguchi, Saitama (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 13/002,076

(22) PCT Filed: Jun. 30, 2009

(86) PCT No.: PCT/JP2009/061938
§ 371 (c)(1),
(2), (4) Date: Dec. 30, 2010

(87) PCT Pub. No.: WO2010/001886
PCT Pub. Date: Jan. 7, 2010

(65) Prior Publication Data
US 2011/0109137 A1    May 12, 2011

(30) Foreign Application Priority Data

Jul. 2, 2008  (JP) ................................. 2008-173782
Jul. 2, 2008  (JP) ................................. 2008-173829

(51) Int. Cl.
*B60N 2/26*    (2006.01)
*B60N 2/28*    (2006.01)

(52) U.S. Cl.
USPC ............ 297/256.16; 297/256.12; 297/256.13; 297/256.14

(58) Field of Classification Search
USPC ............ 297/216.12, 256.13, 256.16, 256.12, 297/256.14
See application file for complete search history.

(56) References Cited

U.S. PATENT DOCUMENTS

| 5,494,331 | A  | * | 2/1996  | Onishi et al. | ............. 297/256.13 |
| 6,554,358 | B2 | * | 4/2003  | Kain | ........................ 297/256.13 |
| 6,746,080 | B2 |   | 6/2004  | Tsugimatsu et al. | |
| 6,979,057 | B2 | * | 12/2005 | Sedlack | .................... 297/256.15 |
| 7,073,859 | B1 | * | 7/2006  | Wilson | ........................ 297/256.1 |
| 7,086,695 | B2 | * | 8/2006  | Hosoya | .................... 297/256.16 |

(Continued)

FOREIGN PATENT DOCUMENTS

| CN | 1382602 A | 12/2002 |
| EP | 1623868 A1 | 2/2006 |

(Continued)

*Primary Examiner* — Rodney B White

(74) *Attorney, Agent, or Firm* — Birch, Stewart, Kolasch & Birch, LLP

(57) ABSTRACT

There is provided a child car seat that can be stably mounted on a seat of a vehicle by means of a simple mounting operation. A child car seat includes: a pedestal to be mounted on a seat of a vehicle, the pedestal including a base part having a front surface and side surfaces, and a standing part standing from the base part; and a seat body supported on the pedestal. The pedestal includes a waist-belt guide part for guiding a waist belt. The waist-belt guide part includes a front guide part extending on the front surface of the base part, and side guide parts continuous to the front guide part and extending on the side surfaces of the base part. The pedestal includes a lateral guide member having a laterally projecting part laterally projecting from the side surface of the base part, and an upwardly extending part extending upwardly from the laterally projecting part. The laterally projecting part forms at least a portion of a lower edge defining a side guide part.

14 Claims, 23 Drawing Sheets

U.S. PATENT DOCUMENTS

| | | | |
|---|---|---|---|
| 7,163,265 B2 * | 1/2007 | Adachi | 297/256.12 |
| 7,195,315 B2 | 3/2007 | Rikhof | |
| 7,232,185 B2 * | 6/2007 | Hartenstine et al. | 297/250.1 |
| 7,237,840 B2 | 7/2007 | Furui | |
| 7,625,043 B2 * | 12/2009 | Hartenstine et al. | 297/256.13 X |
| 8,083,290 B2 * | 12/2011 | Gillett | 297/256.13 |
| 8,182,035 B2 * | 5/2012 | Hartenstine et al. | 297/256.13 |

FOREIGN PATENT DOCUMENTS

| | | |
|---|---|---|
| JP | 2001-138786 A | 5/2001 |
| JP | 2002-301964 A | 10/2002 |
| JP | 2002-316565 A | 10/2002 |
| JP | 2005-22447 A | 1/2005 |
| JP | 2006-507171 A | 3/2006 |

* cited by examiner

CHILD CAR SEAT

FIELD OF THE INVENTION

The present invention relates to a child car seat mountable on a seat of a vehicle.

BACKGROUND ART

Various child car seats that are used when an infant is carried by passenger cars or the like have been proposed. For example, JP2002-316565A discloses a child car seat including a pedestal to be mounted on a seat of a vehicle, and a seat body supported on the pedestal.

In the child car seat disclosed in JP2002-316565A, a waist belt of a seatbelt traverses a center part of the pedestal, and the pedestal is mounted on the vehicle seat only by the waist belt.

However, in view of the recent increasing safety awareness, a child car seat is required to be more stably mounted on a vehicle seat. However, it is not preferable that a method of mounting the child seat on the vehicle seat is complicated.

The present invention has been made in view of the above circumstances. A first object of the present invention is to provide a child car seat that can be stably mounted on a seat of a vehicle by means of a simple mounting operation.

In addition, in a child car seat disclosed in JP2002-301964A, a seat body can be slid with respect to a pedestal, and an inclination angle of the seat body with respect to the pedestal can be varied, i.e., the seat body can be reclined. In addition, not only an infant can be seated on the seat body so as to face forward in an advancing direction, but also the infant can be seated on the seat body so as to face backward in the advancing direction.

In the child car seat disclosed in JP2002-301964A, when the seat body is slid with respect to the pedestal, a seat part of the seat body slides on the pedestal. In addition, a backrest part of the seat body is provided with a connection guide to be engaged with a groove formed in the pedestal. When the seat body is slid with respect to the pedestal, the connection guide passes through the groove of the pedestal, whereby the sliding motion of the seat body can be guided. Thus, according to this child car seat, the seat body can be smoothly slid.

The present invention is relevant to the child car seat disclosed in JP2002-301964A. A second object of the present invention is to provide a child car seat in which a seat body can be more smoothly slid with respect to a pedestal, whereby a reclining operation can be performed with great ease.

DISCLOSURE OF THE INVENTION

A first object of the present invention is to provide a child car seat that can be stably mounted on a seat of a vehicle by means of a simple mounting operation.

A second object of the present invention is to provide a child car seat in which a seat body can be more smoothly slid with respect to a pedestal, whereby a reclining operation can be performed with great ease.

A first child car seat of the present invention is a child car seat comprising: a pedestal to be mounted on a seat of a vehicle, the pedestal including a base part having a front surface, side surfaces and a bottom surface, and a standing part standing from the base part; and a seat body supported on the pedestal; wherein: the pedestal includes a waist-belt guide part for guiding a waist belt of a seatbelt provided on the seat of the vehicle, the waist-belt guide part including a front guide part extending on the front surface of the base part, and side guide parts continuous to the front guide part and extending on the side surfaces of the base part; the pedestal further includes a lateral guide member having a laterally projecting part laterally projecting from the side surface of the base part, and an upwardly extending part extending upwardly from the laterally projecting part; and the laterally projecting part of the lateral guide member forms at least a portion of a lower edge defining the side guide part. According to the first child car seat of the present invention, it is possible to mount the child car seat stably on the seat of the vehicle, without making complicated the mounting operation.

In the first child car seat of the present invention, the lower edge of the side guide part may be located on an uppermost position, in a part defined by the laterally projecting part, along a normal line direction relative to the bottom surface of the base part.

In addition, in the first child car seat of the present invention, a position of the lower edge of the side guide part may be gradually elevated along a normal line direction relative to the bottom surface of the base part, as a point of the lower edge approaches from a side of the front surface of the base part toward a part formed by the laterally projecting part.

Further, in the first child car seat of the present invention, the laterally projecting part of the lateral guide member may form a portion of the lower edge of the side guide part, the part being most distant from the front guide part.

Further, in the first child car seat of the present invention, the side guide part may be formed as a groove at least a lower edge of which is defined by a step; and a stepped surface forming the step may be smoothly connected to the laterally projecting part of the lateral guide member forming a portion of the lower edge.

Further, in the first child car seat of the present invention, a position of a top part of the upwardly extending part along a normal line direction relative to the bottom surface of the base part may be located on the same height position as, or slightly lower than, a position along the normal line direction of an upper edge of the side guide part in which the lower edge is formed by the laterally projecting part.

Further, in the first child car seat of the present invention, at least a portion of an upper edge defining the side guide part from above may be formed of a folded member that projects laterally from the side surface of the base part and then extends downward.

Further, in the first child car seat of the present invention, a width from an upper edge defining the side guide part to the lower edge defining the side guide part may gradually narrow as a point approaches a portion where the lower edge is formed by the laterally projecting part from a side of the front surface of the base part.

A second child car seat of the present invention is a child car seat comprising: a pedestal to be mounted on a seat of a vehicle, the pedestal including a base part, and a standing part standing from the base part; and a seat body supported on the pedestal so as to be slidable with respect to the pedestal; wherein: the seat body includes a seat part and a backrest part connected to the seat part; the backrest part is provided with a connection guide that can pass through a groove formed in the standing part when the seat body is slid; the connection guide includes a proximal part extending from the backrest part, and a bent part extending from the proximal part in a bent manner; and the groove formed in the standing part extends in a bent manner correspondingly to the shape of the connection guide, in a cross-section perpendicular to a moving direction of the connection guide when the seat body is slid. According to the second child car seat of the present invention, the seat body can be more smoothly slid with respect to the pedestal, whereby a reclining operation can be preformed with great ease.

In the second child car seat of the present invention, a direction in which the proximal part of the connection guide extends, and a direction in which the bent part extends from the proximal part, may be substantially perpendicular to each other, in the cross-section perpendicular to the moving direction of the connection guide when the seat body is slid.

In addition, in the second child car seat of the present invention, the seat body can be slid with respect to the pedestal up to a turning position at which the seat body can be turned on the pedestal; both of a portion of the groove for accommodating the proximal part and a portion of the groove accommodating the bent part may be opened in an end surface of the standing part; and the connection guide may be configured to exit the groove in the end surface of the standing part, when the seat body reaches the turning position, whereby the seat body can be turned on the pedestal.

The second child car seat of the present invention may further comprises a cover to be detachably attached to the standing part that is exposed by the movement of the backrest part when the seat body is turned on the pedestal, wherein, when the cover is attached to the standing part, the cover covers the groove opening in the end surface of the standing part.

In addition, in the second child car seat of the present invention, the standing part of the pedestal may be provided with a lock-off device for holding a shoulder belt of a seatbelt provided on the seat of the vehicle; and when the cover is attached to the standing part, the cover may cover the lock-off device and the shoulder belt that is held by the lock-off device and that extends on the standing part.

Further, in the second child car seat of the present invention, the backrest part may be provided with the connection guide on one side and the connection guide on the other side, which are disposed apart from each other in a lateral direction; the bent part of the connection guide on one side may be bent from the proximal part toward one side of the lateral direction, and the bent part of the connection guide on the other side is bent from the proximal part toward the other side of the lateral direction; formed in the standing part may be: the groove on the one side to be engaged with the connection guide on the one side, and the groove on the other side to be engaged with the connection guide on the other side; the groove on the one side and the groove on the other side being apart from each other in the lateral direction; and the groove on the one side and the groove on the other side are opened in the end surface of the standing part; the cover may be provided, in an area of a surface that is exposed when the cover is attached to the standing part, the area being positioned on the end surface when the cover is attached to the standing part, with a sheet-like member on one side and a sheet-like member on the other side which are away from each other in the lateral direction; the sheet-like member on the one side may be opened to the one side in the lateral direction, and the sheet-like member on the other side is opened to the other side in the lateral direction; and when the sheet body is turned without the cover being detached, the connection guide on the other side may be caught by an opening portion of the sheet-like member on the one side, or the connecting guide on the one side may be caught by an opening portion of the sheet-like member on the other side.

EMBODIMENT OF CARRYING OUT THE INVENTION

Figure 1:
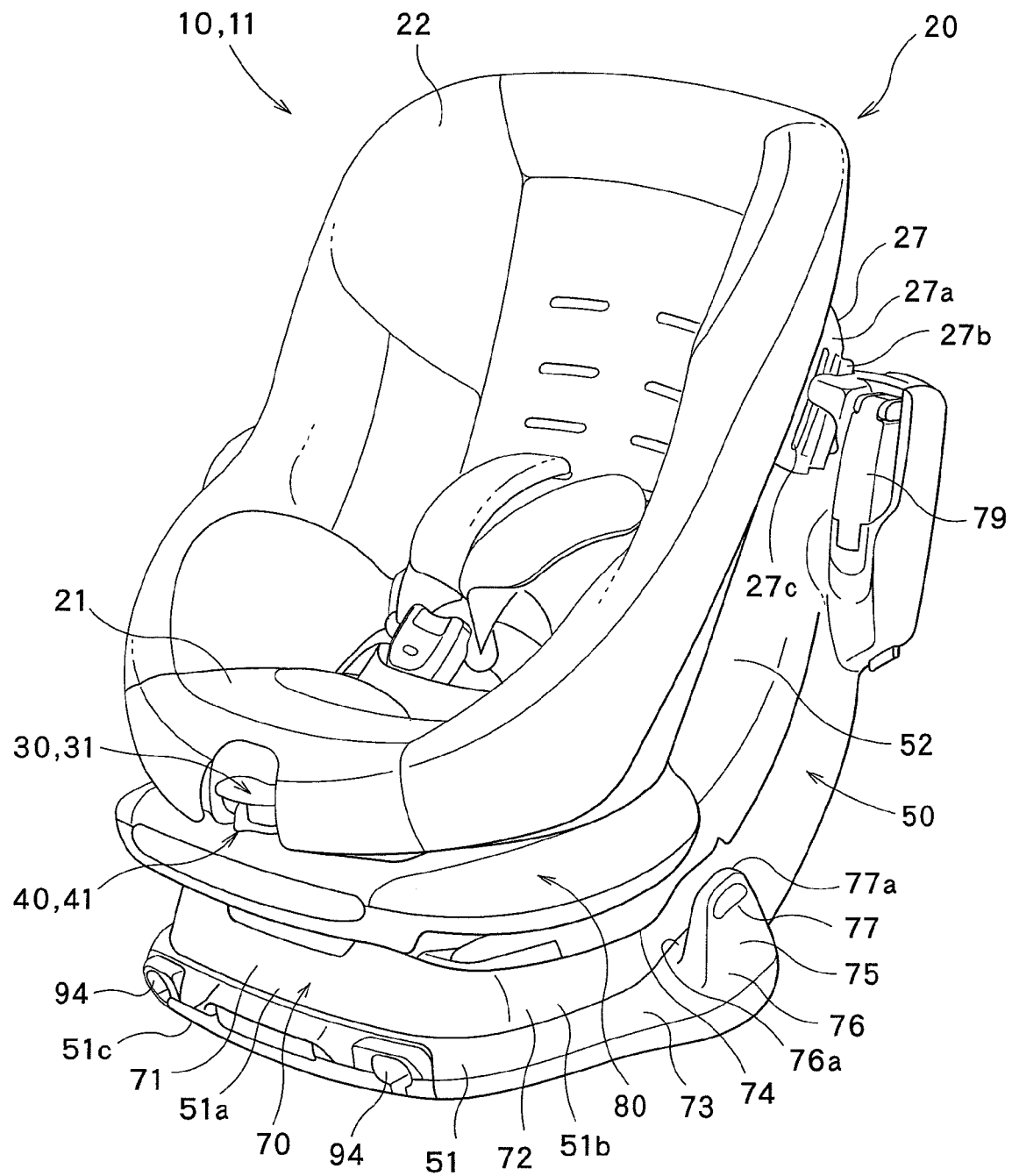
FIG. 1 is a perspective view showing an embodiment of a child car seat (child car seat body) of the present invention.

An embodiment of the present invention will be described herebelow with reference to the drawings.

FIGS. 1 to 31 are views for explaining an embodiment of a child car seat (child seat, car seat) of the present invention. FIGS. 1 to 5 show the overall structure of the child car seat. As shown in FIGS. 1 to 5, a child car seat 10 in this embodiment includes, as a child car seat body 11, a pedestal 50 to be mounted on a seat 1 of a vehicle (such as an automobile), a reclining base 80 supported on the pedestal 50, and a seat body 20 supported, together with the reclining base 80, on the pedestal 50. As shown in FIG. 3, the child car seat 10 further includes a support leg 100 that is detachably attached to the pedestal 50 of the child car seat body 11. The support leg 100 extends up to a floor surface 3 of the vehicle supporting the vehicle seat 1, and supports a front part of the child car seat body 11 (pedestal 50) from below.

The pedestal 50 includes a base part 51 to be placed on a seat part 1a of the vehicle seat 1, as shown in FIG. 3, and a standing part 52 standing from the base part 51 so as to be opposed to a back part 1b of the vehicle seat 1, as shown in FIG. 3. The base part 51 has a front surface 51a, side surfaces (lateral surfaces) 51b and a bottom surface 51c (see, FIG. 1 and so on). On the other hand, the seat body 20 has a seat part 21 supported on the base part 51 such that the seat body 20 can be slid with respect to the base part 51 of the pedestal 50, and a backrest part 22 extending from the seat part 21.

Figure 4:
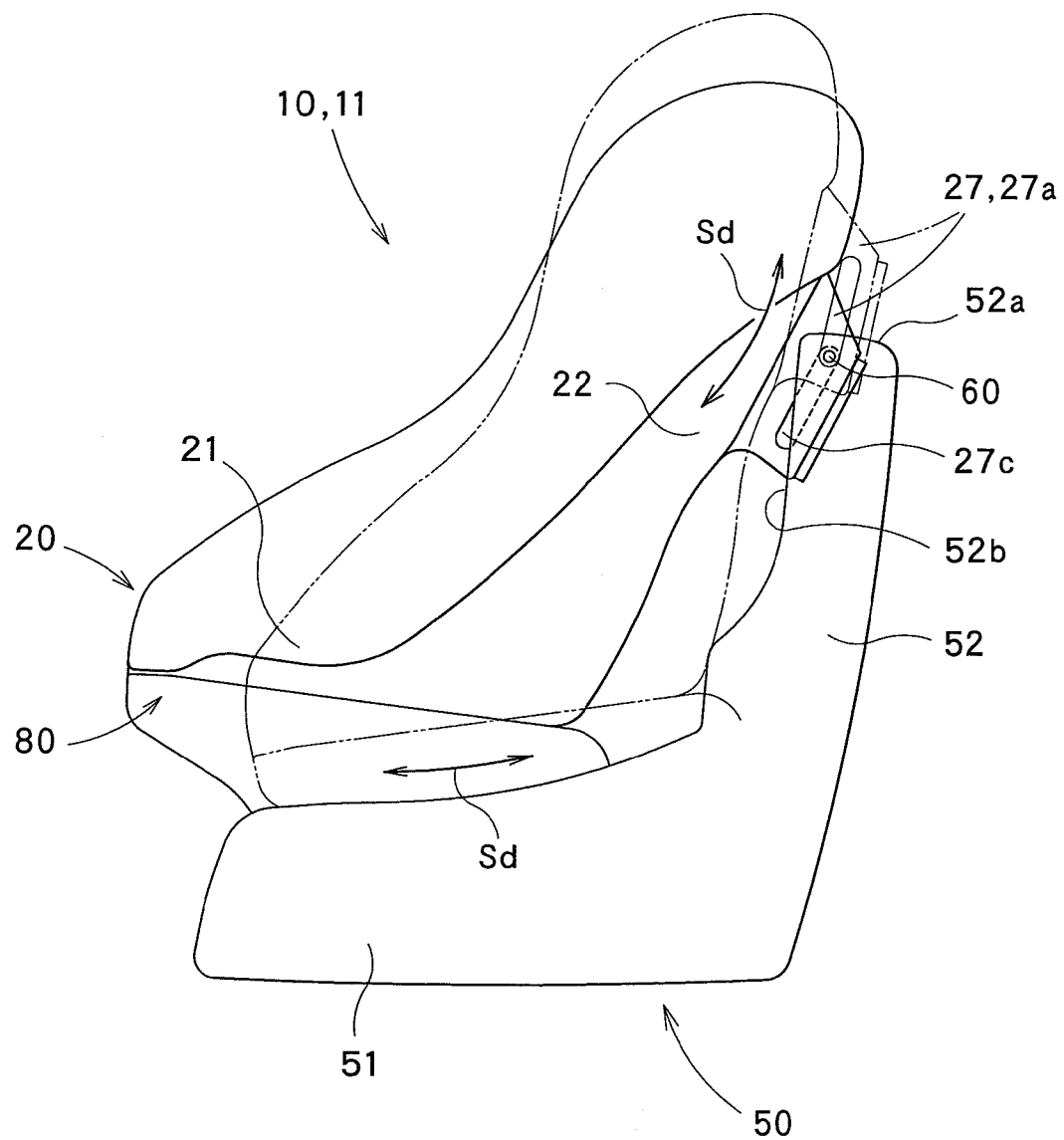
FIG. 4 is a side view of the child car seat, for explaining a reclining mechanism of the seat body.

As shown in FIG. 4, the reclining base 80 can be slid with respect to the pedestal 50 along a direction sd along a vertical plane. In addition, the seat body 20, together with the reclining base 80, can be slid with respect to the pedestal 50 along the direction sd along the vertical plane. As shown in FIG. 4, when the seat body 20 is slid with respect to the pedestal 50, an inclination angle of the seat body 20 with respect to the pedestal 50 varies. Namely, the seat body 20 on which an infant sits facing forward can be reclined.

Figure 5:
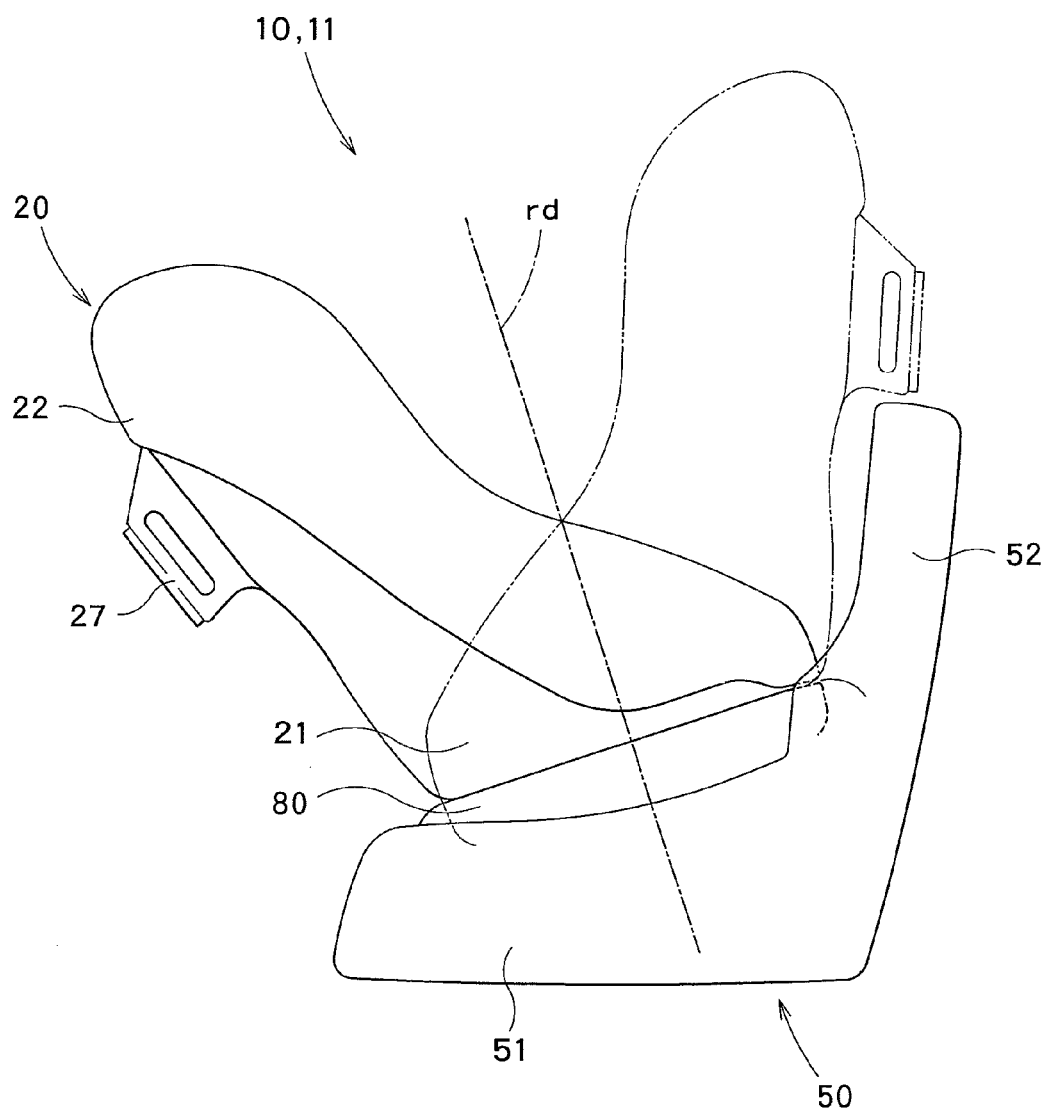
FIG. 5 is a side view showing the child car seat, for explaining a shifting condition of the seat body between the forward facing condition and the backward facing condition.

Further, as shown in FIG. 5, the seat body 20 can be turned about a turning axis rd extending in the vertical plane, with respect to the reclining base 80 and the pedestal 50. As shown in FIG. 5, by turning the seat body 20 with respect to the pedestal 50, an infant can be put (seated or laid) on the child car seat 10, such that the infant faces backward. Herebelow, the condition of the seat body 20 shown by the solid line in FIG. 5 is referred to as "backward facing condition" of the seat body, and the condition of the seat body shown by the two-dot chain line in FIG. 5 is referred to as "forward facing condition" of the seat body.

Figure 2:
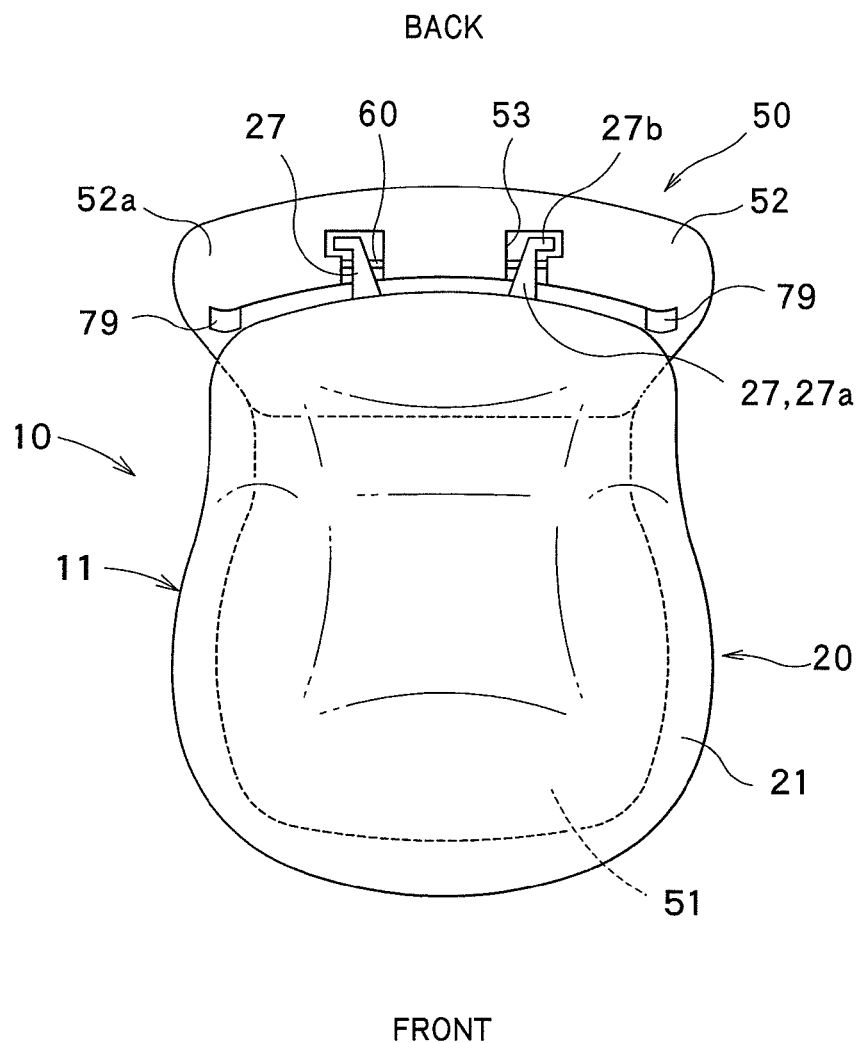
FIG. 2 is a top view showing the child car seat in which seat body is in a forward facing condition.
Figure 3:
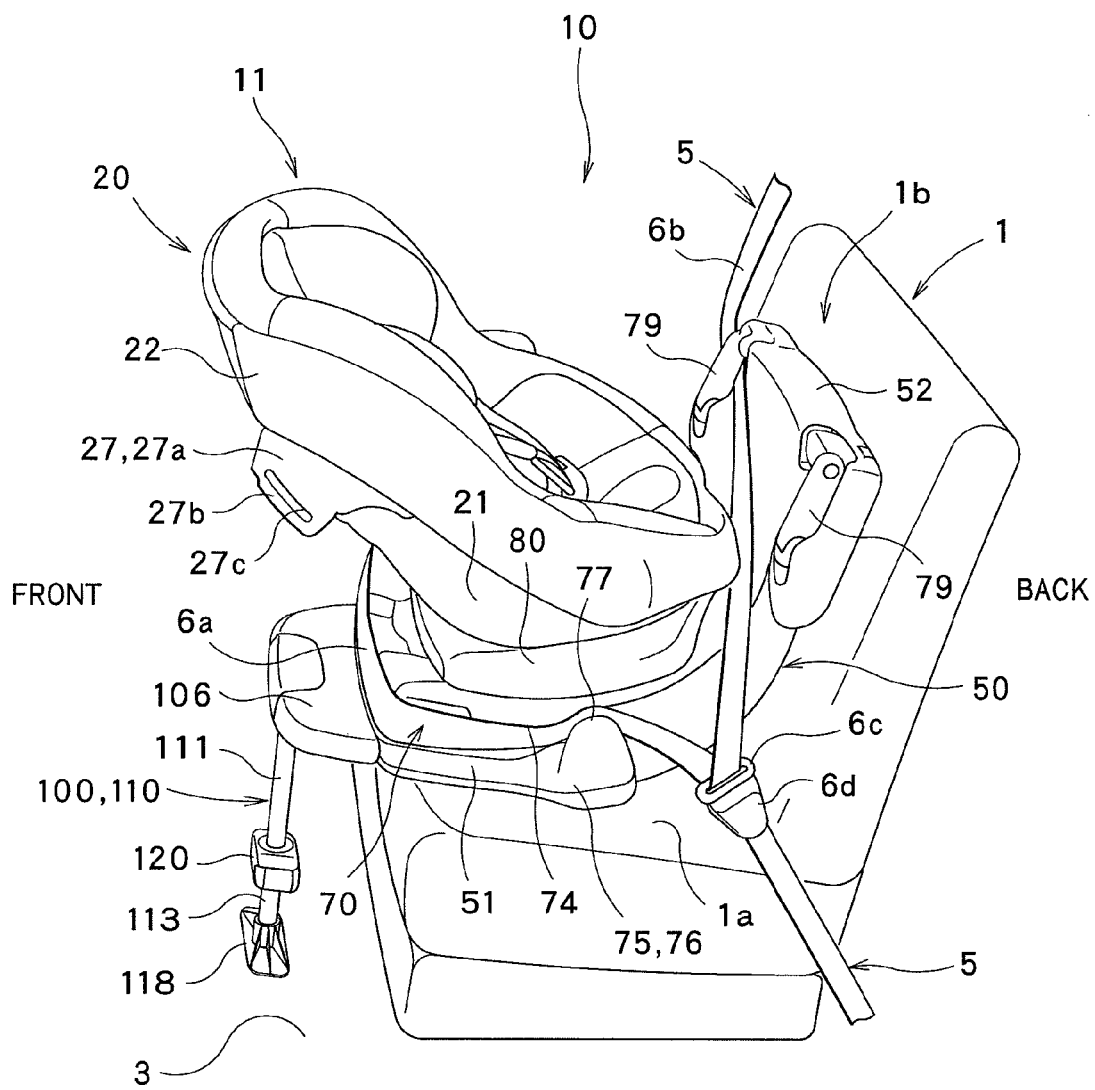
FIG. 3 is a perspective view showing the child car seat mounted on a seat of a vehicle, with the seat body being in a backward facing condition.

In this specification, unless otherwise specified, the terms "front (forward)" and "back (backward)" mean "front" and "back" on the basis of a usual driving of a vehicle (see, FIGS. 2 and 3).

Herebelow, the child car seat body 11 is generally described at first, and then the respective parts of the child car seat 10 are further described.

[General Description of Child Car Seat Body]

Figure 6:
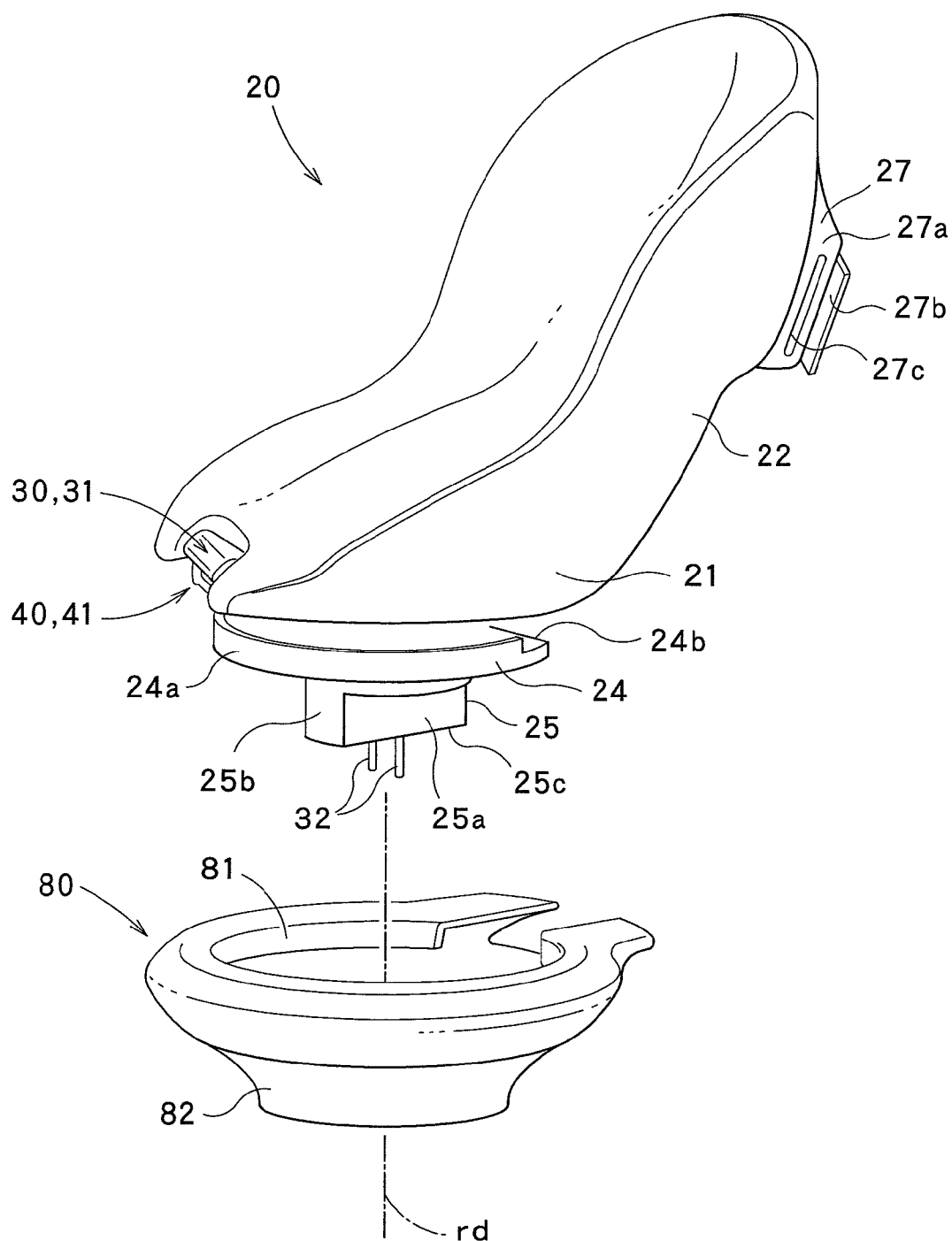
FIG. 6 is an exploded perspective view showing the seat body and a reclining base.
Figure 7:
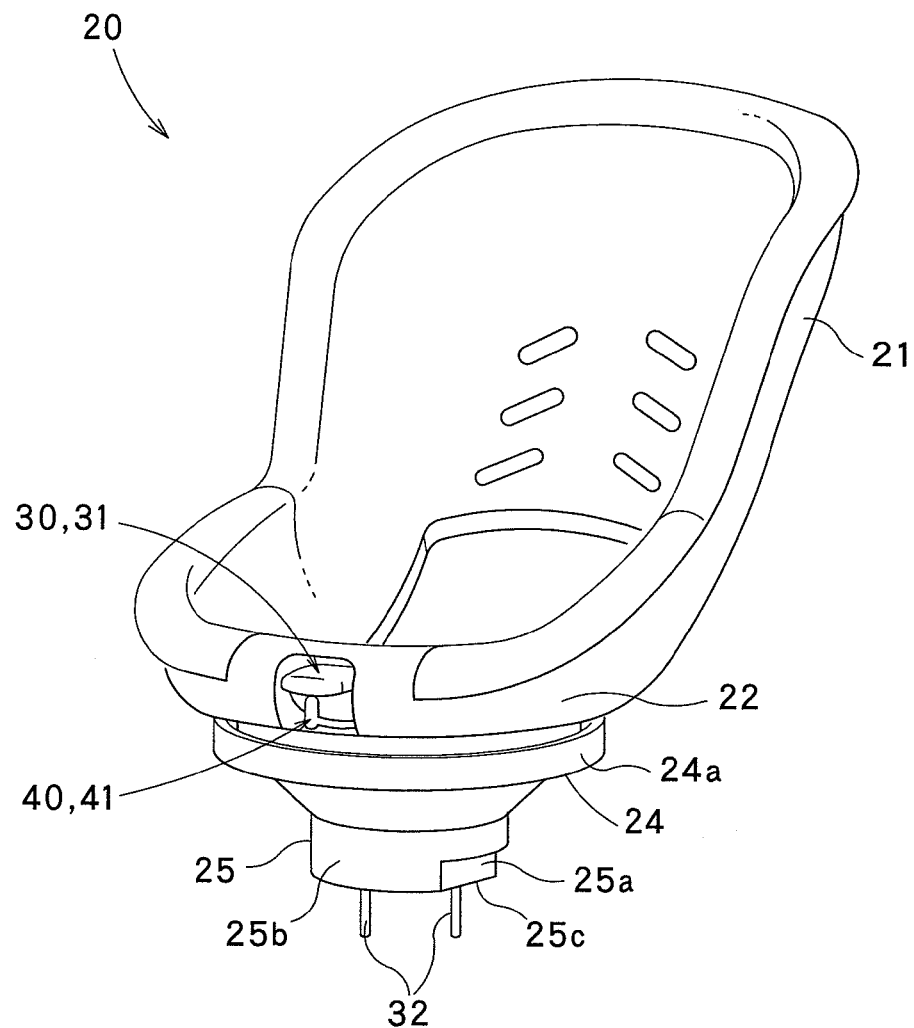
FIG. 7 is a perspective view showing the seat body.

At first, the seat body 20 of the child car seat 10 (child car seat body 11) is generally described. As described above, the seat body 20 includes the seat part 21 and the backrest part 22. The seat part 21 and the backrest part 22 are formed of frame members and cushion members fitted in the frame members. As shown in FIGS. 6 and 7, the seat body 20 further includes a disc 24 disposed on a lower part the seat part 21, and a guide piece 25 projecting downward from the disc 24. The disc 24 has a rail 24a that extends substantially circumferentially. On a backside of the rail 24a on the basis of an infant seated on the seat body 20, the rail 24a is provided with a cutout 24b. Namely, the rail 24a terminates on the backside thereof. On the basis of an infant seated on the seat body 20, the guide piece 25 has a pair of flat side surfaces 25a extending in parallel in the front and back direction, and arcuate side surfaces 25b that connect the front ends and the back ends of the pair of flat side surfaces 25a. Each arcuate side surface 25b is formed as a part of a cylindrical surface, and has a circular arcuate profile in a cross-section of the guide piece 25.

As shown in FIGS. 1, 6 and so on, the backrest part 22 is provided with a connection guide 27 projecting backward, on the basis of an infant seated on the seat body 20. The connection guide 27 includes a proximal part 27a projecting from the backrest part 22, and a bent part 27b further extending from the proximal part 27a in a bent manner, in a cross-section perpendicular to a movement path sd (see, FIG. 4) along which the connection guide is moved when the seat body 20 is slid. That is to say, the connection guide 27 is formed to have a hook-like shape. As can be understood from FIG. 2, the direction in which the proximal part 27a of the connection guide 27 extends, and the direction in which the bent part 27b of the connection guide 27 extends, are substantially perpendicular to each other, in the cross-section perpendicular to the movement path sd of the connection guide 27. While the seat body 20 is slid, the connection guide 27 passes through a groove 53 formed in the standing part 52 of the pedestal 50. As shown in FIG. 6 and so on, formed in the proximal part 27a is a slit (elongated through-hole) 27c extending along the movement path sd of the connection guide 27. The groove 53 formed in the pedestal 50 will be described in detail below.

As shown in FIG. 2, the backrest part 22 is provided with the connection guide 27 on one lateral side, and the connection guide 27 on the other lateral side, which are disposed apart from each other in a lateral direction (width direction) perpendicular to the front and back direction. The bent part 27b of the connection guide 27 on one side (e.g., the right connection guide 27 in the plane of FIG. 2) is bent from the proximal part 27a toward one side (e.g., right side in the plane of FIG. 2) of the lateral direction. The bent part 27b of the connection guide 27 on the other side is bent from the proximal part 27a toward the other side of the lateral direction. Namely, the bent parts 27b of the pair of connection guides 27 extend from the respective proximal parts 27a so as to be apart from each other along the lateral direction.

The seat body 20 contains therein a lifting mechanism 30 and an operation-amount adjusting mechanism 40, which are used when the seat body 20 is slid and turned with respect to the pedestal 50. As shown in FIGS. 6 and 7, the lifting mechanism 30 includes a pair of projecting members 32 projecting downward from the bottom surface 25c of the guide piece 25, and an operation member 31 connected to the projecting members 32. In this embodiment, the operation member 31 is formed as a swingable operation lever, and the projecting members 32 are formed as pins (locking pins) that are retractable into the guide piece 25. By operating the operation member (operation lever) 31, a projecting amount of the projecting members 32 from the bottom surface 25c of the guide piece 25 can be adjusted. In particular, in this embodiment, the operation member 31 is connected to the projecting members 32 through a link mechanism, such that a retracting amount of the projecting members 32 is dependent on an operation amount of the operation member 31. On the other hand, the operation-amount adjusting mechanism 40 is a mechanism that is brought into contact with the operation member 31 of the lifting mechanism 30 so as to regulate the operation amount (moving amount, swinging amount) of the operation member 31. The lifting mechanism 30 and the operation-amount adjusting mechanism 40 will be described in detail below.

Figure 10:
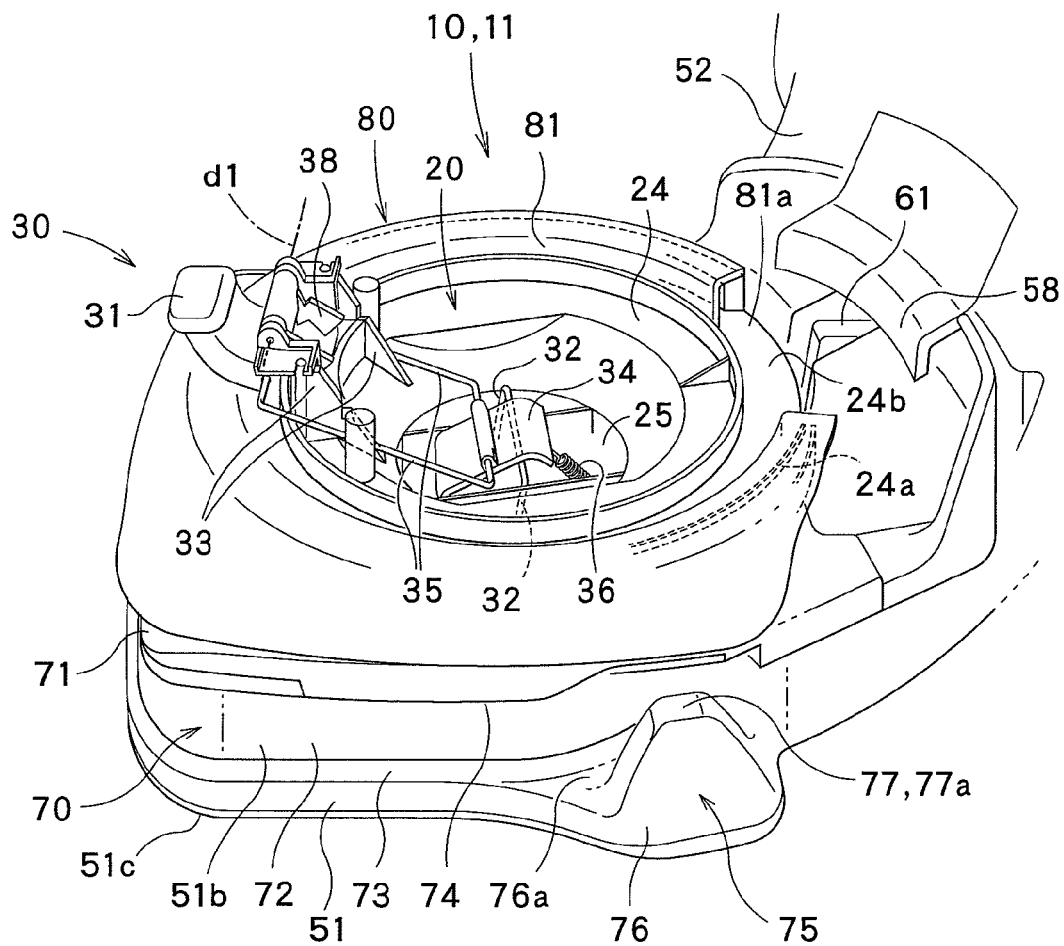
FIG. 10 is a partial perspective view showing the child car seat, without showing a seat part of the seat body and a backrest part thereof.

Next, the reclining base 80 is further described. As shown in FIG. 10 and so on, the reclining base 80 is fitted on the circumference of the disc 24 of the seat body 20 so as to be positioned around the disc 24 and the guide piece 25 of the seat body 20. In addition, the reclining base 80 is slidably mounted on the pedestal 50. As a result, as shown in FIG. 4, the seat body 20, together with the reclining base 80, is slid with respect to the pedestal 50.

Figure 11:
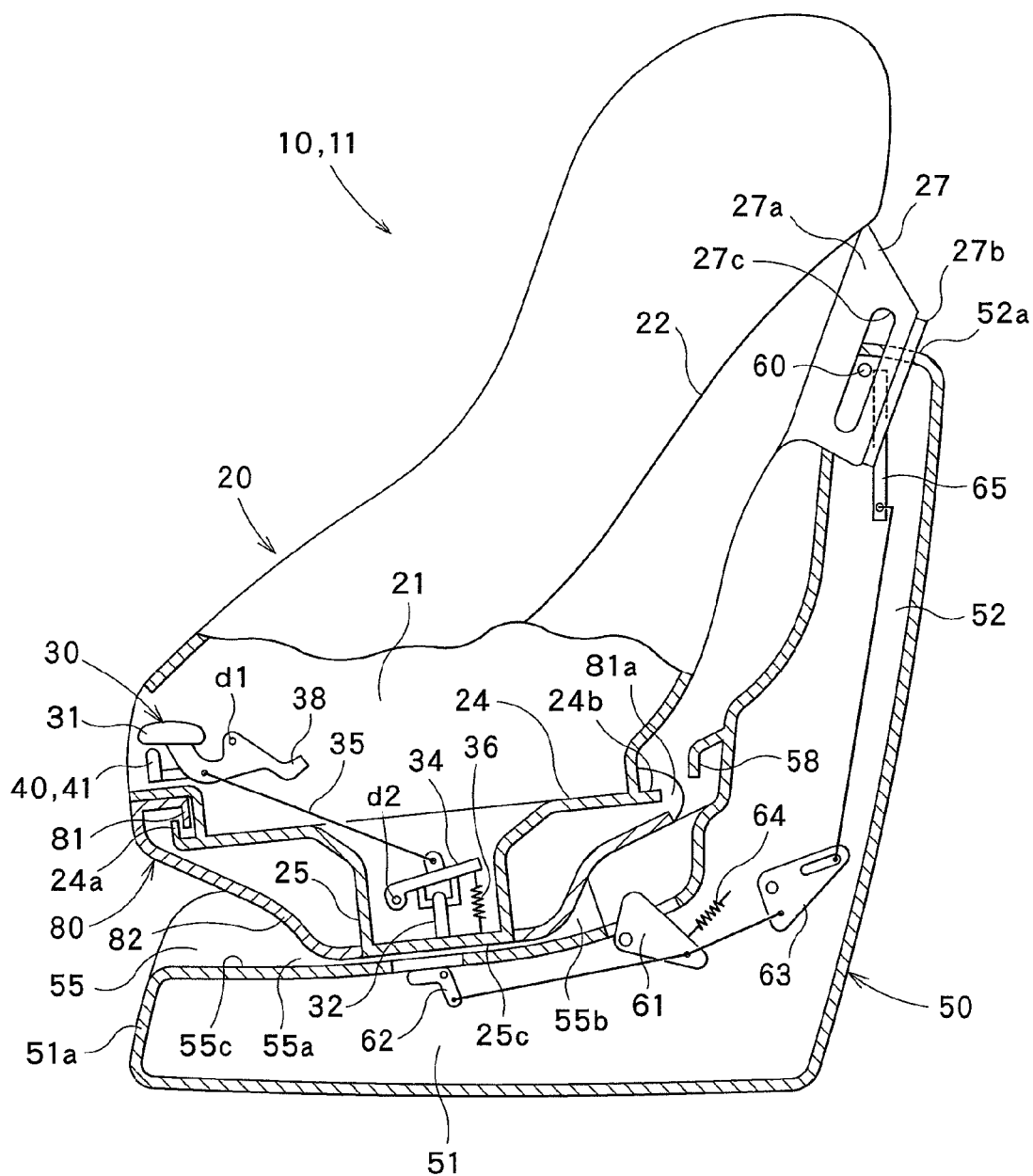
FIG. 11 is a partial side view showing the child car seat that is seen from the lateral side.

In addition, as shown in FIGS. 6, 10 and 11, the reclining base 80 has a flange part 81 that is engaged with the rail 24a of the disc 24. The flange part 81 extends in a circular arcuate manner.

When the rail 24a of the disc 24 is guided to the flange part 81 of the reclining base 80, the seat body 20 including the disc 24 can be turned with respect to the reclining base 80. As a result, the seat body 20 can be turned with respect to the pedestal 50 on which the reclining base 80 is mounted. As shown in FIGS. 6 and 10, the flange part 81 has a cutout 81a formed in the backside thereof. As shown in FIGS. 10 and 11, when the seat body 20 is in the forward facing condition, the cutout 81a of the flange part 81 and the cutout 24b of the rail 24a of the disc 24 face each other.

Further, as shown in FIG. 6, the reclining base 80 has a skirt part 82 extending downward toward the pedestal 50. As shown in FIG. 11, when the reclining base 80 is mounted on the pedestal 50, the skirt part 82 is located within a recess formed in the base part 51 of the pedestal 50.

Next, the pedestal 501 is described in detail. As shown in FIG. 3, the pedestal 50 can be mounted on the vehicle seat 1 by means of a seatbelt 5 of a vehicle, which has a waist belt 6a and a shoulder belt 6b. Thus, the standing part 52 of the pedestal 50 is provided with two lock-off devices 79 for clamping the shoulder belt 6b of the seatbelt 5. The lock-off devices 79 are positioned away from each other in the lateral direction, so that the lock-off devices 79 can be adapted to two inclined directions of the shoulder belt 6b. As shown in FIG. 3, the shoulder belt 6b clamped by the lock-off devices 79 obliquely transverses the standing part 52 of the pedestal 50. The pedestal 50 also has a waist-belt guide part 70 that guides the waist belt 6a. The waist-belt guide part 70 will described in detail below.

Figure 8:
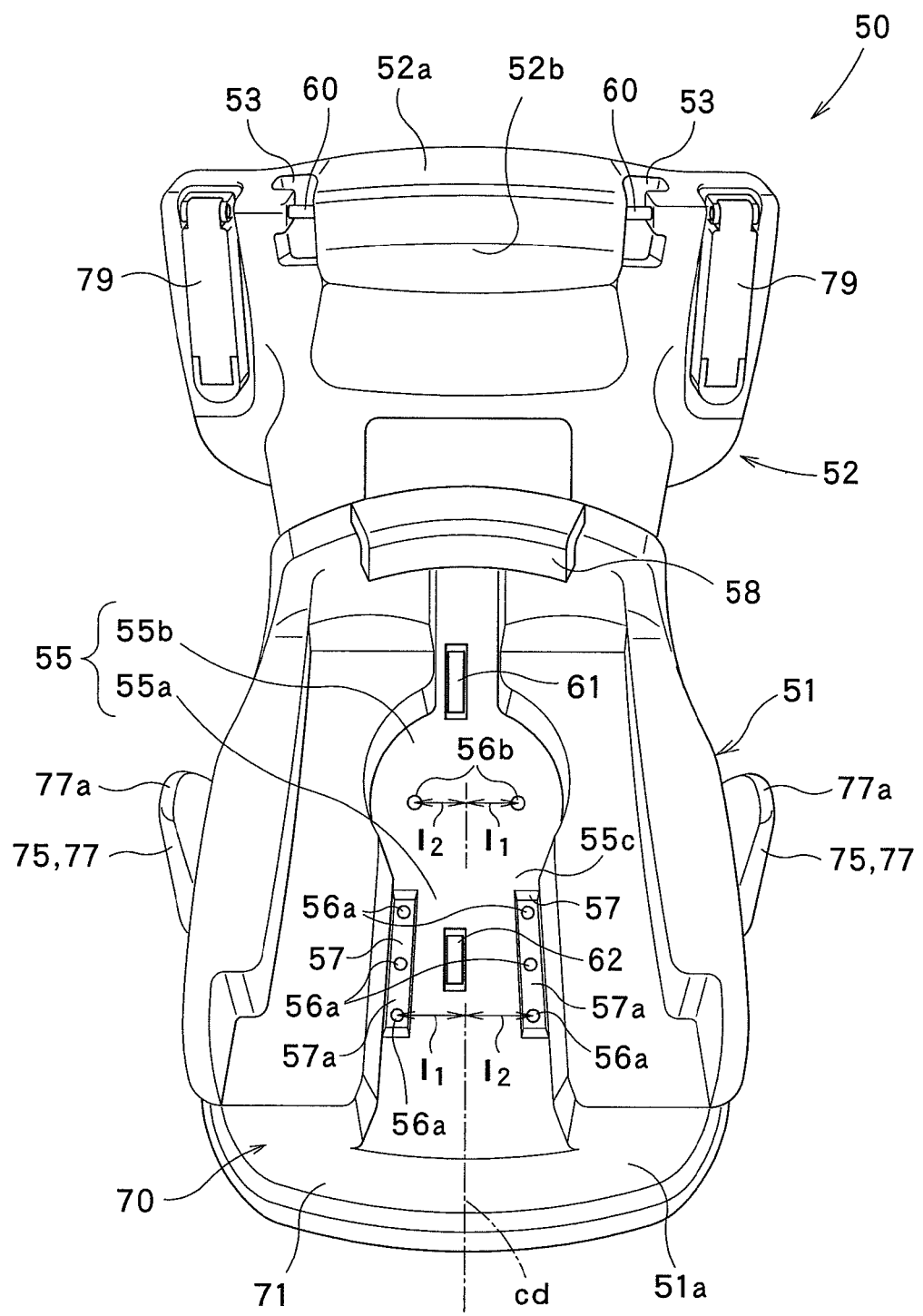
FIG. 8 is a view showing a pedestal that is seen from the front.
Figure 9:
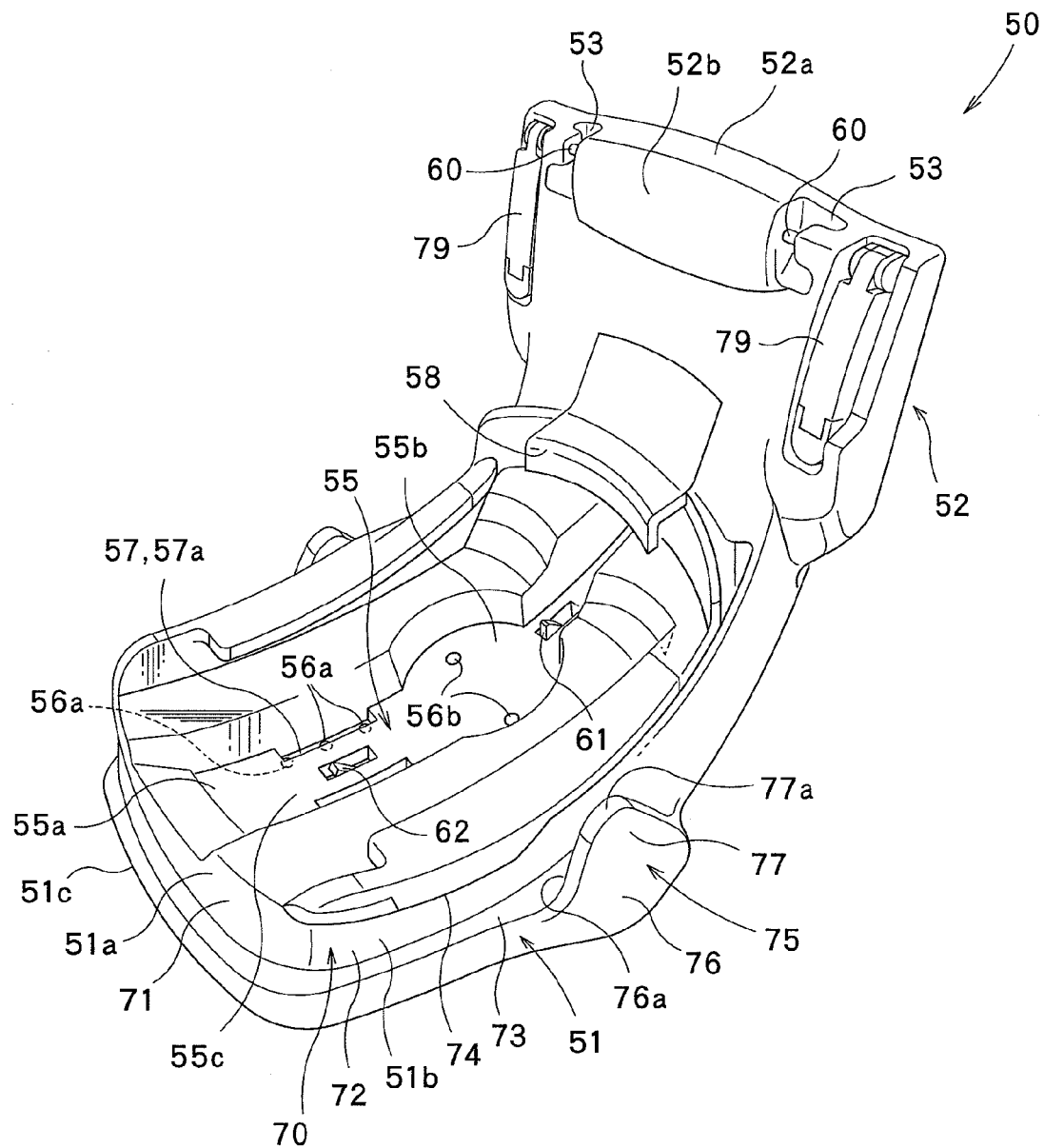
FIG. 9 is a perspective view showing the pedestal.

As shown in FIGS. 8 and 9, a guide groove 55 extending along the front and back direction is formed in the base part 51 of the pedestal 50 in a center of the width direction (lateral direction). The guide groove 55 includes: a reclining guide part 55a formed of a groove extending in the front and back direction, the groove having sidewalls in parallel with each other; and a turn guide part 55b formed of a cylindrical recess disposed on a backside end of the reclining guide part 55a. A width between the pair of sidewalls of the reclining guide part 55a is determined such that the reclining guide part 55a can be engaged with the flat side surfaces 25a of the guide piece 25 of the seat body 20 whereby the seat body 20 can be slid with respect to the pedestal 50. In addition, a diameter of the cylindrical recess of the turn guide part 55b is determined such that the turn guide part 55b can be engaged with the arcuate side surfaces 25b of the guide piece 25 of the seat body 20 whereby the seat body 20 can be turned with respect to the pedestal 50. That is to say, the turning axis line rd of the seat body 20 with respect to the pedestal 50 is defined by the turn guide part 55b.

In this structure, since the guide piece 25 of the seat body 20 in the forward facing condition can be moved in the guide groove 55, the seat body 20 can be slid with respect to the pedestal 50. In addition, when the guide piece 25 of the seat body 20 is located in the turn guide part 55b of the guide groove 55, the seat body 20 can be turned with respect to the pedestal 50. When the seat body 20 is slid or turned with respect to the pedestal 50, the bottom surface 25c of the guide piece 25 of the seat body 20 slides on a bottom surface 55c of the guide groove 55. In addition, similarly, when the reclining base 80 is slid together with the seat body 20 with respect to the pedestal 50, at least a portion of the skirt part 82 of the reclining base 80 moves in the guide groove 55.

As shown in FIGS. 8 and 9, the reclining guide part 55a of the guide groove 55 is provided with a pair of right and left locking holes 56a that receive the pair of aforementioned projecting members 32 of the seat body 20. In the drawings, the plurality of (three) pairs of lock holds 56a are provided in the front and back direction. Meanwhile, the turn guide part 55b is provided with a pair of right and left turning-position locking holes 56b that receive the pair of projecting members 32. As shown in FIG. 8, a distance between the pair of right and left locking holes 56a and a distance between the pair of right and left turning-position locking holes 56b are the same with each other. However, the pair of locking holes 56a and the pair of turning-position locking holes 56b are offset from each other by the same dimensions in the opposite directions with respect a front and back axis line cd passing through the center in the width direction. That is to say, a distance l1 between the front and back axis line cd and the left locking hole 56a, and a distance l1 between the front and back axis line cd and the right turning-position locking hole 56b, are identical to each other. In addition, a distance l2 between the front and back axis line cd and the right locking hole 56a, and a distance l2 between the front and back axis line cd and the left turning-position locking hole 56b, are identical to each other.

Correspondingly to the offset of the locking holes 56a and the turning-position locking holes 56b, the aforementioned pair of projecting members 32 of the seat body 20 are configured to be located on offset positions with respect to the front and back axis line cd, when the seat body 20 is supported on the pedestal 50. As a result, when the pair of projecting members 32 of the seat body 20 are engaged with the locking holes 56a, the seat body 20 is held in the forward facing condition. On the other hand, when the pair of projecting members 32 of the seat body 20 are engaged with the turning-position locking holes 56b, the seat body 20 is held in a reversed condition (backward facing condition) shown by the solid line in FIG. 5. That is to say, in this embodiment, in a range within which the seat body 20 can be slid, there are included three reclining positions at which the seat body 20 is maintained at different inclination angles, and a turning position at which the seat body 20 can be turned with respect to the pedestal 50.

As shown in FIGS. 8 and 9, a step (difference) is formed between a surface 57a in the guide groove 55 of the pedestal 50, in which the respective locking holes 56a are formed, and the surface 55c in the guide groove 55 of the pedestal 50, in which the turning-position locking holes 56b are formed. In the guide groove 55, the bottom surface of the reclining guide part 55a and the bottom surface of the turn guide part 55b are formed as the single continuous surface 55c. However, recessed parts 57 are formed in this single continuous surface 55c, and the respective locking holes 56a are formed in the bottom surfaces 57a of the recessed parts 57. Thus, between the surface 57a in which the respective locking holes 56a are formed and the surface 55c in which the turning-position locking holes 56b are formed, there is the step whose height is the same as that of the recessed part 57.

As shown in FIGS. 8 to 11, a turn guide 58 is disposed on a lower part of the standing part 52 of the pedestal 50. When the guide piece 25 of the seat body 20 is moved to reach the turn guide part 55b, the turn guide 58 is located on substantially the same circumferential position as that of the flange part 81 of the reclining base 80. When the seat body 20 on the turning position is tuned, the rail 24a formed on the disc 24 of the seat body 20 is engaged not only with the flange part 81 of the reclining base 80 but also with the turn guide 58. As a result, the seat body 20 can be smoothly turned on the turning position.

As described above, the standing part 52 of the pedestal 50 has the groove 53 that receives the connection guides 27 disposed on the seat body 20. The seat body 20 is provided with the connection guide 27 on one side (e.g., the right connection guide in the plane of FIG. 2) and the connection guide 27 on the other side (e.g., the left connection guide in the plane of FIG. 2), which are apart from each other in the lateral direction. As shown in FIG. 2, formed in the standing part 52 are the groove 53 on one side (e.g., the right groove in the plane of FIG. 2) to be engaged with the connection guide 27 on the one side, and the groove 53 on the other side to be engaged with the connection guide 27 on the other side, which are away from each other in the lateral direction. As can be understood from FIG. 2, in a cross-section of the groove 53 perpendicular to the longitudinal direction thereof (direction along the movement path sd of the connection guide 27), each groove 53 extends in a bent manner correspondingly to the shape of the connection guide 27.

As shown in FIGS. 8 and 9, in an upward facing end surface (upper end surface) 52a of the standing part 52, both of a portion of the groove 53 for accommodating the proximal part 27a and a portion of the groove 53 for accommodating the bent part 27b are opened. As a result, as shown in FIG. 1, for example, an upper portion of each connection guide 27 of the seat body 20, which passes through the groove 53 of the pedestal 50, passes the openings in the upper end surface 52a of the standing part 52 so as to extend outside the groove 53. Further, as shown by the two-dot chain line in FIG. 5, when the seat body 20 is slid up to the turning position, the connection guide 27 of the seat body can exit outside from the groove 53. Thus, the engagement between the connection guide 27 and the groove 53 is released (disengaged), so that the seat body 20 can be turned with respect to the pedestal 50.

Also in a forward facing face (front face) 52b of the standing part 52, all the portion of the groove 53 is opened. As a result, in this embodiment, as shown in FIG. 1, for example, the opposed ends of the connection guide 27 can extend outside the groove 53.

As shown in FIG. 8 and so on, in each groove 53, there is disposed a connection pin 60 that extends in the lateral direction (width direction) perpendicular to the front and back direction. The connection pin 60 can penetrate through a slit 27c formed in the proximal part 27a of the connection guide 27 being passing through the groove 53. The connection pin 60 is supported so as to be movable along the lateral direction, whereby the connection pin 60 can take a position at which the connection pin 60 penetrates through the slit 27c formed in the proximal part 27a of the connection guide 27, and a position at which the connection pin 60 is retracted into the standing part 52.

As shown in FIG. 11, a first cam 61 is disposed such that the first cam 61 can project into the guide groove 55 from an opening formed in a position that is further backward the turn guide part 55b. In addition, a second cam 62 is disposed such that the second cam 62 can project into the guide groove 55 from an opening formed in the reclining guide part 55a.

The first cam 61 and the second cam 62 are connected to each other by a link such that, when one cam stands so that a distal end thereof projects to the guide groove 55, the other cam is retracted from the guide groove 55. The first cam 61 is further connected to a bell crank 63 provided in the pedestal 50 via a link.

The first cam 61 is urged by a tension spring 64 so as to project into the guide groove 55. When the guide piece 25 of the seat body 20 is moved into the turn guide part 55b, the first cam 61 is pressed by the skirt part 82 of the reclining base 80 and is pushed into the guide groove 55. On the other hand, when the guide piece 25 of the seat body 20 is moved to the reclining guide part 55a, the second cam 62 is pressed by the skirt part 82 of the reclining base 80 and is pushed into the guide groove 55.

Figure 12:
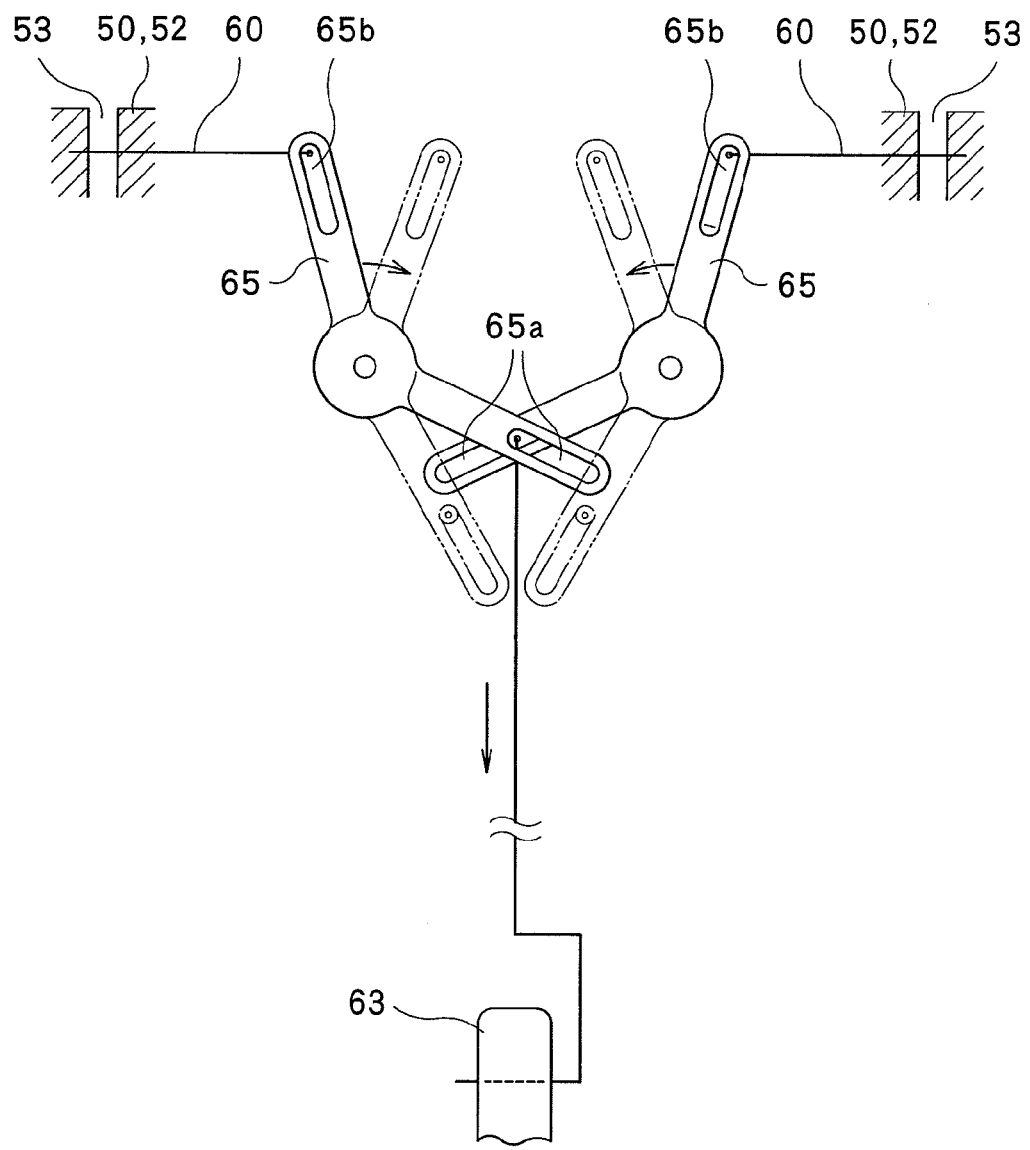
FIG. 12 is a view for explaining a link structure accommodated in a standing part of the pedestal, the link mechanism being connected to a connection pin.

As shown in FIG. 12, operation arms 65 each having two arms are rotatably provided in the standing part 52 of the pedestal 50. Elongated holes 65a and 65b are formed in each arm. The one elongated hole 65a is connected to the bell crank 63 via a link, and the other elongated hole 65b is connected to the connection pin 60. Each operation arm 65 is configured to be rotated so as to draw the connection pin 60 into the standing part 52 of the pedestal 50, when the bell crank 63 is swung so as to move the link downward.

As described above, the support leg 100 is detachably attached to the pedestal 50. The structure of the pedestal 50 relating to the support leg 100 will be described in detail below along with the support leg 100.

In the child car seat 10 (child car seat body 11) as structured above, by lifting up the projecting members (locking pins) 32 from the locking holes 56a of the pedestal 50, the seat body 20 can be slid from one reclining position to another reclining position. At this time, due to the urging force of the tension spring 64, each connection pin 60 extends into the groove 53 via the link mechanism so as to penetrate through the slit 27c of the connection guide 27 being passing through the groove 53. As a result, the guide piece 25 of the seat body 20 is directed to the guide groove 55 of the pedestal 50, and the connection guide 27 of the seat body 20 is directed to the groove 53 and the connection pin 60 of the pedestal 50. Thus, the seat body 20 can be smoothly slid with respect to the pedestal 50. In particular, in this embodiment, the connection guide 27 has not only the proximal part 27a but also the bent part 27b that extends from the proximal part 27a in a bent manner, whereby the connection guide 27 can be located on a predetermined position in the groove 53. Therefore, the sliding motion of the seat body 20 with respect to the pedestal 50 can be further smoothened and stabilized. In this manner, the inclination angle of the backrest part 22 of the seat body 20 with respect to the pedestal 50 can be stably and smoothly varied.

Then, when the projecting members (locking pins) 32 are lifted from the locking holes 56a of the pedestal 50, and the seat body 20 is slid from the reclining position to the turning position, the skirt part 82 of the reclining base 80, which is slid together with the seat body 20 with respect to the pedestal 50, is brought into contact with the first cam 61 projecting into the guide groove 55 so as to press the first cam 61. As a result, when the seat body 20 reaches the turning position, the swinging operation of the first cam 61 is transmitted to the connection pins 60 via the bell crank 63, the operation arms 65 and the links, whereby the connection pins 60 are retracted into the standing part 52 of the pedestal 50. Thus, in dependence on the movement of the seat body 20 toward the turning position, as shown by the two-dot chain line in FIG. 5, the connection guides 27 can exit from the grooves 53. Since the connection guides 27 are not arrested by the guide grooves 53 any more, the seat body 20 having moved up to the turning position can be turned about the turning axis line rd.

Further, as described above, the pairs of locking holes 56a, the pair of turning-position locking holes 56b and the projecting members 32 are offset from each other with respect to the front and back axis line cd passing through the center in the lateral direction. In addition, until the seat body 20 having been slid up to the turning position is reversed so as to take the backward facing condition, the projecting members 32 do not enter the turning-position locking holes 56b. Thus, the seat body 20, which has been slid up to the turning position, can be easily and reliably turned until the seat body 20 takes the backward facing condition.

In addition, when the projecting members (locking pins) 32 are lifted from the locking holes 56a of the pedestal 50, and the seat body 20 in the backward facing condition is reversed and then moved up to the reclining position, the connection guides 27 again enter the grooves 53 from the upward facing end surface 52a of the standing part 52. Since the connection guide 27 has not only the proximal part 27a but also the bent part 27b extending from the proximal part 27a in a bent manner, the connection guide 27 can be directed to a predetermined position in the groove 53. At this time, due to the urging force of the tension spring 64, the first cam 61 projects into the guide groove 55 and the connection pins 60 project into the grooves 53. Since the connection guides 27 having the bent parts 27b are located on the predetermined positions in the grooves 53, the connection pins 60 can smoothly penetrate through the slits 27c of the connection guides 27.

Figure 13:
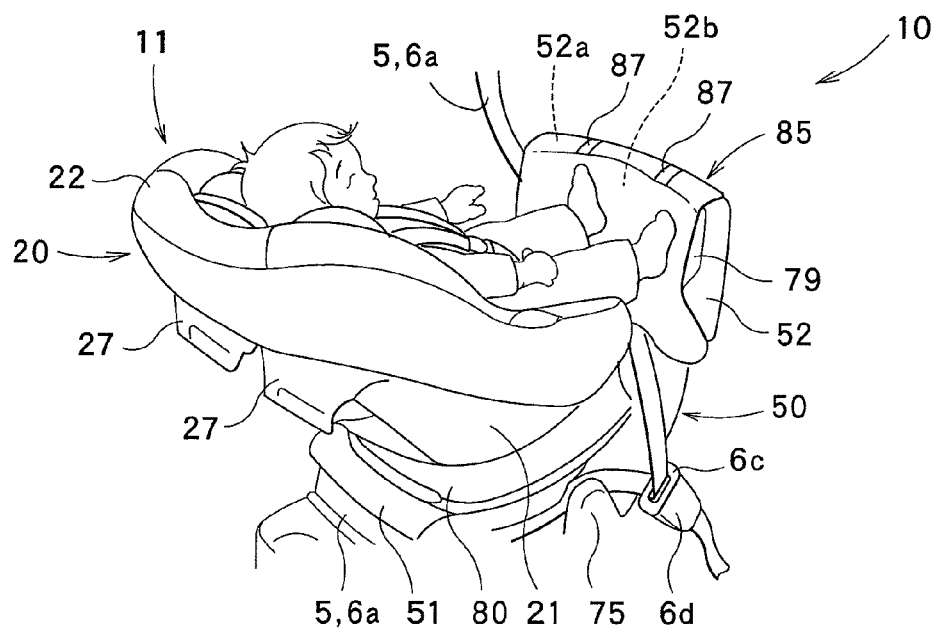
FIG. 13 is a perspective view showing the child car seat in the backward facing condition, with a cover being attached thereto.
Figure 14:
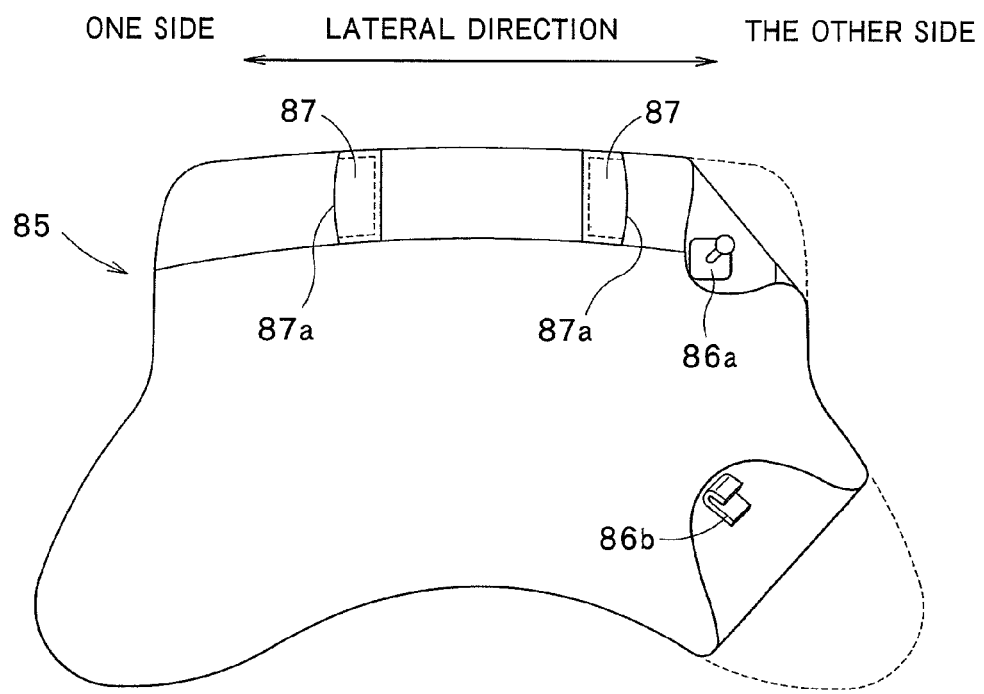
FIG. 14 is a top view showing the cover.

As shown in FIG. 13, in this embodiment, the child car seat 10 (child car seat body 11) further includes a cover 85 that can be detachably attached to the standing part 52. The cover 85 can cover the standing part 52 which is exposed by the movement of the backrest part 22 when the seat body 20 is turned on the pedestal 50. Namely, the cover 85 is attached to the standing part 52 of the child car seat 10 (child car seat body 11) in the backward facing condition. As shown in FIG. 14, attachment tools 86a and 86b are disposed on respective end portions of a rear surface of the cover 85. The standing part 52 of the pedestal 50 has attachment tools (not shown) corresponding to these attachment tools 86a and 86b. The cover 85 can be detachably attached to the standing part 52 by means of these attachment tools 86a and 86b.

As is illustrated, the cover 85 is configured to cover the upward facing end surface 52a of the standing part 52 and the forward facing surface 52b of the standing part 52. As described above, the grooves 53 are opened in the upper end surface 52a of the standing part 52. In addition, in the front surface 52b of the standing part 52, the other ends of the grooves 53 are opened and the lock-off devices 79 are disposed. Further, the shoulder belt 6b of the seat belt 5 clamped by the lock-off devices 79 obliquely transverses the front surface 52b of the standing part 52. The cover 85 covers the grooves 53, the lock-off devices 79 and the shoulder belt 6b. That is to say, the grooves 53, the lock-off devices 79 and the shoulder belt 6b can be prevented from being exposed to an infant seated on the child car seat 10 in the backward facing condition.

According to such a cover 85, an accident, such as an object being caught by the opening grooves 53, the lock-off devices 79, the shoulder belt 6b and so on, can be efficiently prevented. In addition, the cover 85 is excellent in design, and increases safety feeling when the child car seat 10 is used.

Further, as shown in FIG. 14, the cover 85 is provided, in an area of a surface that is exposed when the cover 85 is attached to the standing part 52, the area being positioned on the end surface 52a when the cover 85 is attached to the standing part 52, with a sheet-like member 87 on one side and a sheet-like member 87 on the other side which are away from each other in the lateral direction. The sheet-like member 87 on the one side (e.g., the right sheet-like member in the plane of FIG. 14) has a rectangular profile whose three edges (e.g., an upper edge, a lower edge, and a right edge) other than an edge on the one side (e.g., left side) in the lateral direction are sewed on the body part. Similarly, the sheet-like member 87 on the other side has a rectangular profile whose three edges other than an edge on the other side in the lateral direction are sewed on the body part. As a result, as shown in FIG. 14, the sheet-like member 87 on the one side is opened to the one side in the lateral direction, and the sheet-like member 87 on the other side is opened to the other side in the lateral direction.

Figure 15:
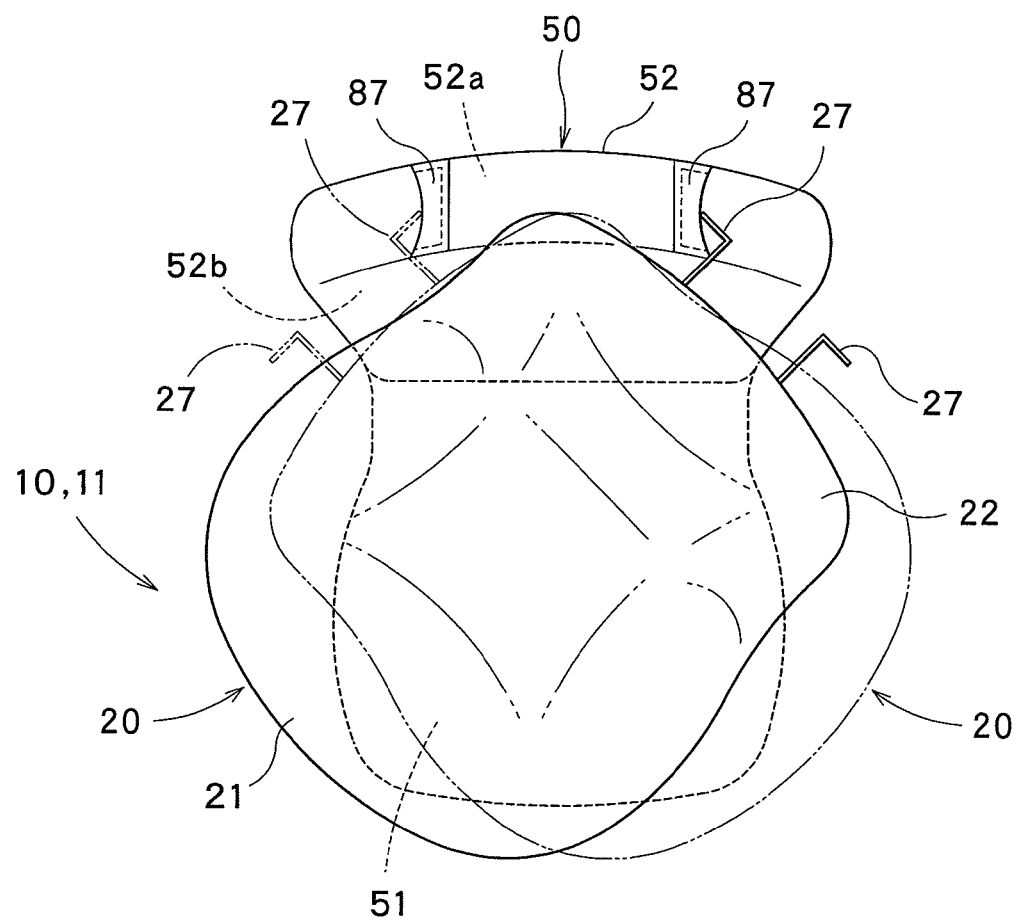
FIG. 15 is a top view for explaining an operation of the cover attached to the child car seat.

These sheet-like members 87 has a function for informing a user of failing of detachment of the cover 85. To be specific, as shown in FIG. 15, when the seat body 20 is turned from the backward facing condition toward the forward facing condition without the cover 85 being detached, the connection guide 27 on the other side is caught by an opening portion 87a of the sheet-like member 87 on the one side, or the connecting guide 27 on the one side is caught by an opening portion 87a of the sheet-like member 87 on the other side. When the sheet-like members 87 are formed of a thick fabric, this function of the sheet-like members 87 can be more efficiently exerted. According to the cover 85 having such sheet-like members 87, the seat body 20 can be prevented from being turned, with the cover 85 being attached to the standing part 52. Thus, damage of the seat body 20, in particular, damage of the connection guides 27 and the cushion members can be efficiently prevented.

[Lifting Mechanism and Operation-Amount Adjusting Mechanism]

Next, the lifting mechanism 30, the operation-amount adjusting mechanism 40, and structures and operations relating to these mechanisms are described in detail.

The lifting mechanism 30 is a mechanism for lifting up the projecting members (locking pins) 32. As described above, the lifting mechanism 30 includes the pair of projecting members (locking pins, pins) 32 projecting downward from the bottom surface 25c of the guide piece 25, and the operation member (operation lever) 31 connected to the projecting members 32. As shown in FIGS. 10 and 11, the operation member 31 is swingably connected to a support base 33 disposed on the disc 24. A swinging axis line d1 of the operation member 31 extends in the lateral direction perpendicular to the front and back direction. Inside the guide piece 25, there is provided a reclining cam 34 that can be swung about a swinging axis line d2 (see, FIGS. 16 to 19) extending in the lateral direction. The reclining cam 34 is connected to the operation member 31 via a link member 35, so that the reclining cam 34 is configured to be swung in dependence on the swinging motion of the operation member 31.

The pair of projecting members 32 projecting from the guide piece 25 are connected to each other at upper portions thereof, and are held by the reclining cam 34. As shown in FIGS. 16 to 19, the projecting members 32 are supported in an elongated hole of the reclining cam 34, whereby the projecting members 32 penetrate through the bottom surface 25c of the guide piece 25 in certain positions. A tension spring 36 is disposed between the reclining cam 34 and the disc 24, whereby the reclining cam 34 is urged to be swung toward the pedestal 50. Namely, the projecting members 32 are urged from the guide piece 25 toward the pedestal 50.

In this manner, the operation member 31 is connected to the projecting members 32 via the link mechanism, such that a retracting amount of the projecting member 32 can be dependent on an operation amount of the operation member 31.

As described above, when the projecting members 32 are engaged with the locking holes 56, the seat body 20 is maintained at the reclining position. Meanwhile, when the projecting members 32 is engaged with the turning-position locking holes 56b, the seat body 20 is maintained in the backward facing condition at the turning position. The recessed parts 57a are formed in the bottom surface 55c of the guide groove 55, and the locking holes 56a are formed in the bottom surfaces 57a of the recessed parts 57. On the other hand, the turning-position locking holes 56b are formed in the bottom surface 55c of the guide groove 55.

Thus, a lifting amount of the projecting members 32 which is required for disengaging the engagement between the projecting members 32 and the pedestal 50 and for sliding the seat body 20 between the plurality of reclining positions, in other words, an amount of lifting the projecting members 32 located within the locking holes 56a up to the bottom surfaces 57a of the recessed parts 57, is smaller than a lifting amount of the projecting member 32 which is required for disengaging the engagement between the projecting members 32 and the pedestal 50 and for sliding the seat body 20 from one of the plurality of reclining positions to the turning position, in other words, an amount of lifting the projecting members 32 located within the locking holes 56a up to the bottom surface 55c of the guide groove 55. That is to say, a first operation amount of the operation member 31, which is required for disengaging the engagement between the projecting members 32 and the pedestal 50 and for sliding the seat body 20 between the plurality of reclining positions, is smaller than a second operation amount of the operation member 31, which is required for disengaging the engagement between the projecting members 32 and the pedestal 50 and for sliding the seat body 20 from one of the plurality of reclining positions to the turning position.

Next, the structure of the operation-amount adjusting mechanism 40 is described in detail. The operation-amount adjusting mechanism 40 is a mechanism that is brought into contact with the operation member 31 of the lifting mechanism 30 so as to regulate an operation amount (moving amount, swinging amount) of the operation member 31.

The operation-amount adjusting mechanism 40 includes: a contacting and regulating member 42 which can be brought into contact with the operation member 31 of the lifting mechanism 30; and a deregulating member 41 connected to the contacting and regulating member 42, the deregulating member 41 being configured to move the contacting and regulating member 42 when operated. The contacting and regulating member 42 can be moved between: a first position pa1 (see, FIG. 21) at which the contacting and regulating member 42 is in contact with the operation member 31 of the lifting mechanism 30 so as to regulate the movement of the operation member 31, such that an operation amount of the operation member 31 is not less than the first operation amount but is less than the second operation amount; and a second position pa2 (see, FIG. 22) at which an operation amount of the operation member 31 is allowed to be not less than the second operation amount. When operated, the deregulating member 41 allows the movement of the contacting and regulating member 42 from the first position pa1 to the second position pa2.

Figure 20:
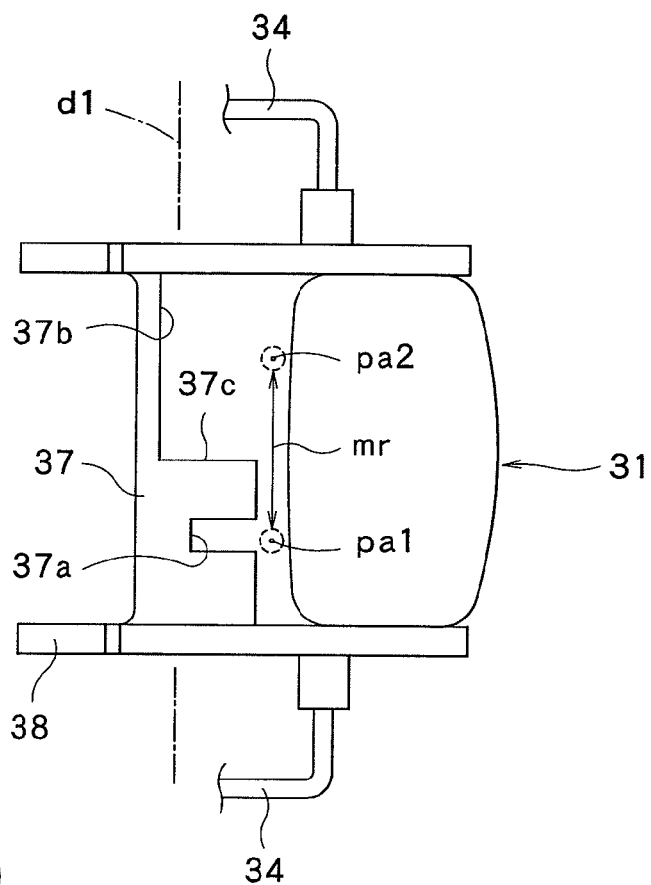
FIG. 20 is a view showing an operation member that is seen from the bottom side.
Figure 21:
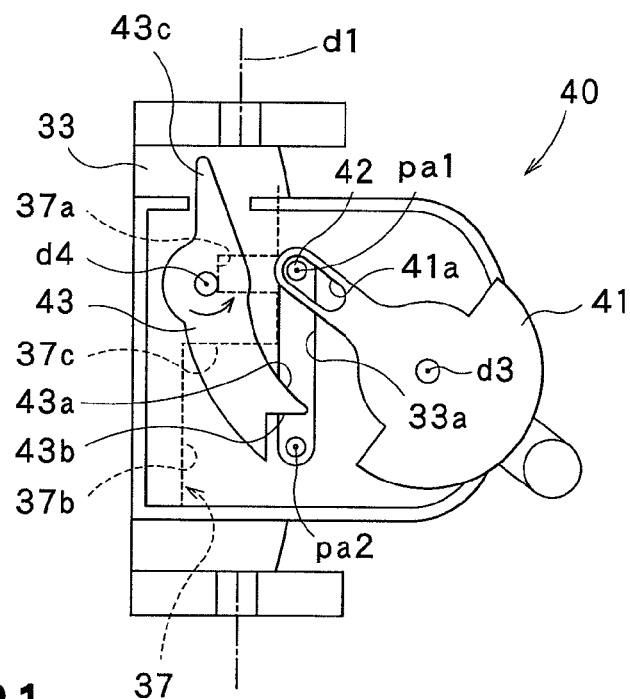
FIG. 21 is a plan view for explaining the operations of the lifting mechanism and the operation-amount adjusting mechanism.
Figure 22:
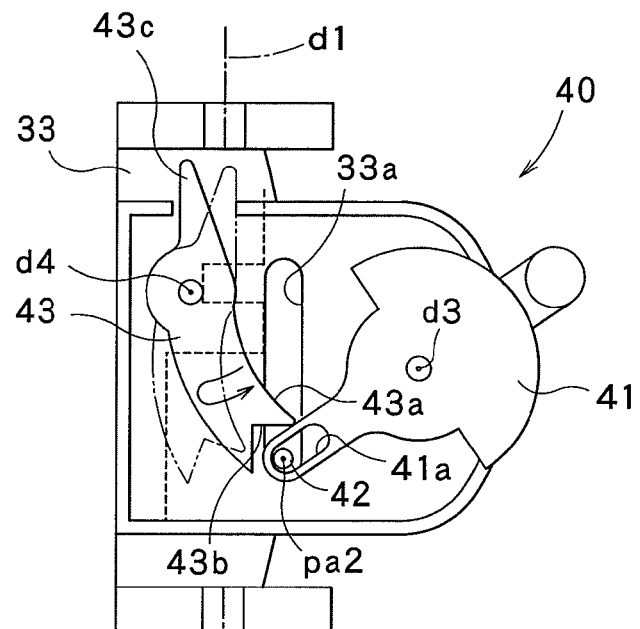
FIG. 22 is a plan view corresponding to FIG. 21, for explaining the operations of the lifting mechanism and the operation-amount adjusting mechanism.

As shown in FIGS. 21 and 22, in this embodiment, the deregulating member 41 is structured as an operation lever that can be swung about a swinging axis line d3 perpendicular to the swinging axis line d1 of the operation member 31 of the lifting mechanism 30. An elongated hole 41a is formed in the deregulating member 41. On the other hand, in this embodiment, the contacting and regulating member 42 is structured as an elongated rod-like member that extends through the elongated hole 41a of the deregulating member 41. In addition, formed in the support base 33 is an elongated hole 33a extending in parallel with the swinging axis line d1 of the operation member 31 of the operation mechanism 30. The contacting and regulating member 42 also extends through the elongated hole 33a of the support base 33. Thus, the contacting and regulating member 42 can be moved on a linear movement path mr (see, FIGS. 20 and 21) along the elongated hole 33a of the support base 33. When the deregulating member 41 is swung, the contacting and regulating member 42 is located on a position at which the elongated hole 41a of the deregulating member 41 and the elongated hole 33a of the support base 33 intersect with each other, when observed along the swinging axis line d3 of the deregulating member 41. The deregulating member 41 is urged by a not-shown torsion spring or the like, from a position at which the contacting and regulating member 42 is located on the second position pa2, which is shown in FIG. 22, toward a position at which the contacting and regulating member 42 is located on the first position pa1, which is shown in FIG. 21.

Figure 18:
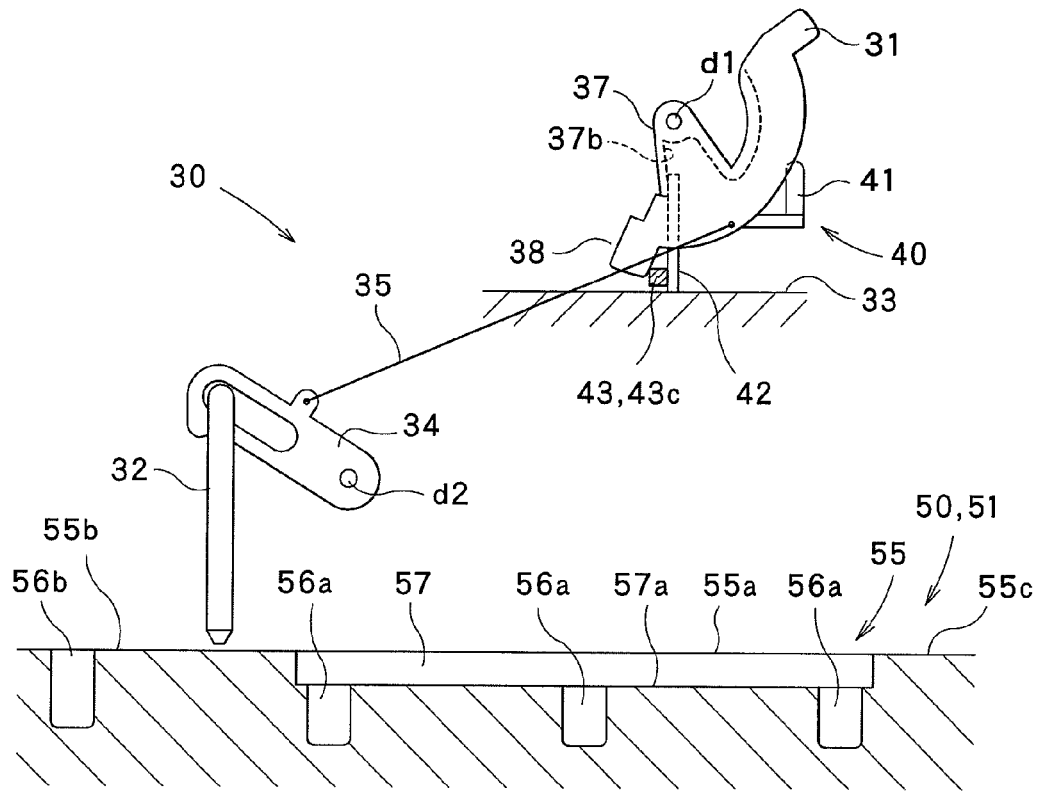
FIG. 18 is a view corresponding to FIGS. 16 and 17, for explaining the operations of the lifting mechanism and the operation-amount adjusting mechanism.
Figure 19:
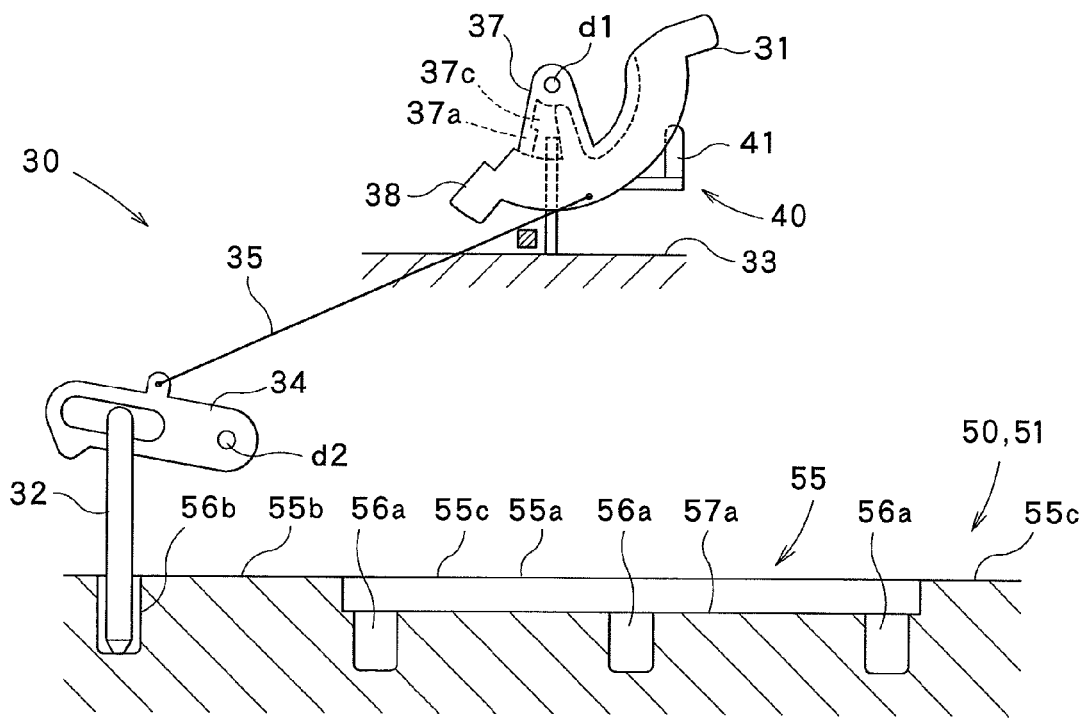
FIG. 19 is a view corresponding to FIGS. 16 to 18, for explaining the operations of the lifting mechanism and the operation-amount adjusting mechanism.

As shown in FIGS. 16 to 19, the deregulating member 41 is positioned in the vicinity of the operation member 31 of the lifting mechanism 30, and the contacting and regulating member 42 is positioned so as to be covered by the operation member 31 of the lifting mechanism 30 from above. On the other hand, as shown in FIGS. 20 and 21, the operation member 31 of the lifting mechanism 30 has a wall part 37 located on a position opposed to the movement path mr. The wall part 37 can be brought into contact with and separated from the movement path mr in accordance with the swinging motion of the operation member 31. FIG. 20 shows the operation member 31 from below, when the projecting member 32 is received in the locking hole 56a (when the operation member 31 is located on an initial position). In FIG. 21, a profile of the wall part 37 of the operation member 31 opposed to the contacting and regulating member 42 is shown by the dotted line. As shown in FIGS. 20 and 21, a part (hereinafter also referred to as "first stopper part") 37a of the wall part 37 opposed to the first position pa1 on the movement path mr is located nearer to the movement path mr than a part (hereinafter also referred to as "second stopper part") 37b of the wall part 37 opposed to second position pa2 on the movement path mr.

Figure 16:
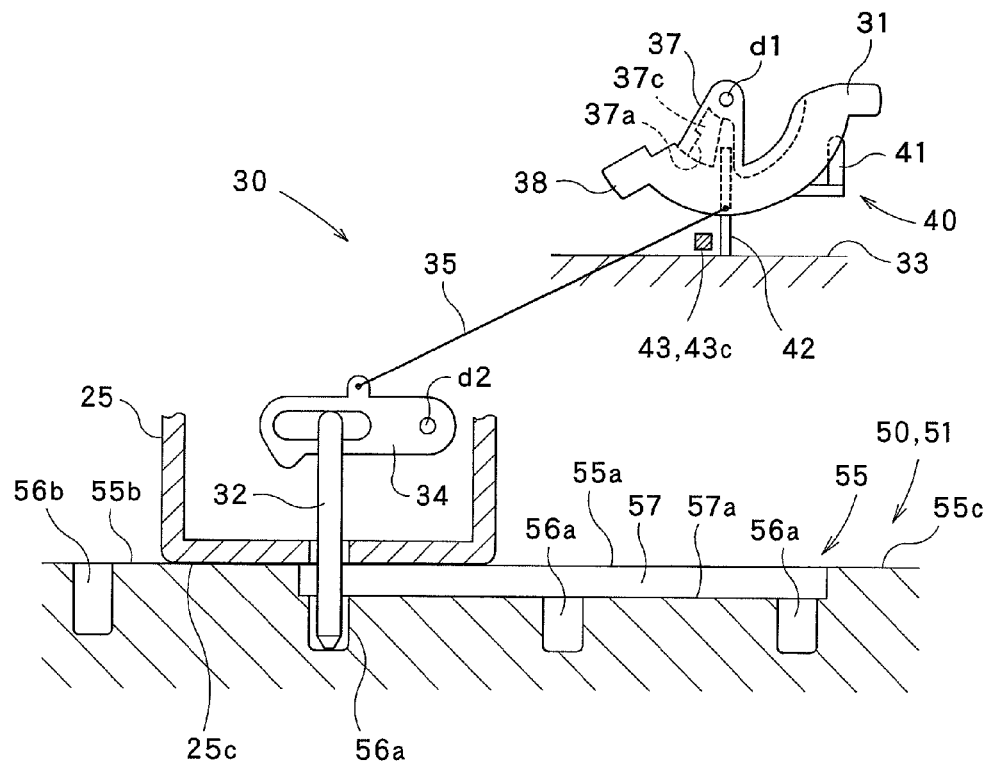
FIG. 16 is a view for explaining operations of a lifting mechanism and an operation-amount adjusting mechanism.
Figure 17:
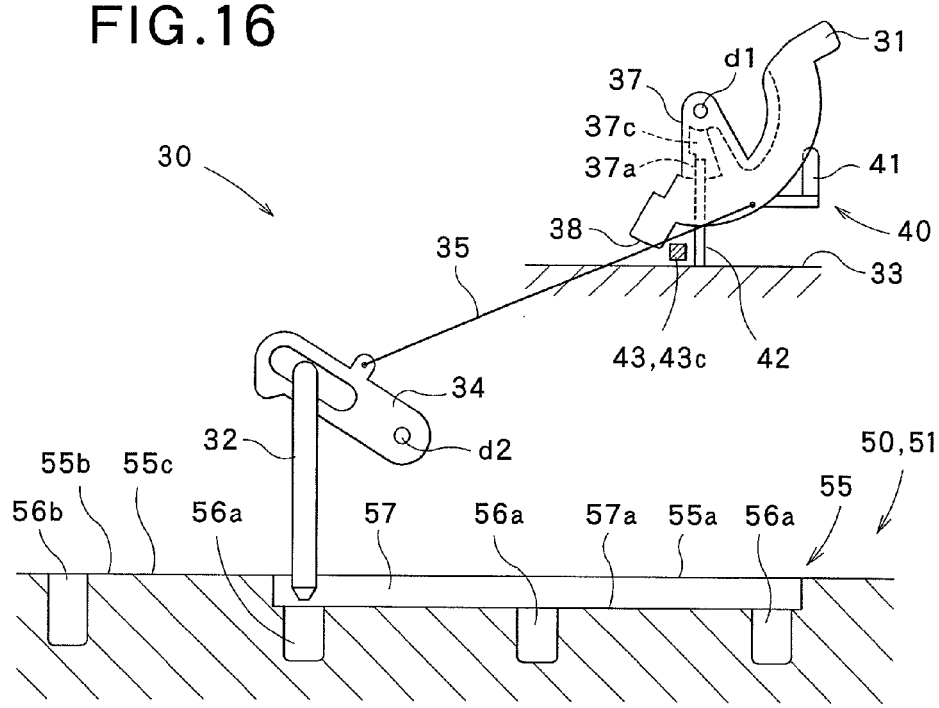
FIG. 17 is a view corresponding to FIG. 16, for explaining the operations of the lifting mechanism and the operation-amount adjusting mechanism.

Owing to such a structure, when the contacting and regulating member 42 is located on the first position pa1, the operation member 31 can be swung from the initial condition in which the projecting members 32 of the lifting mechanism 30 are engaged with any one pair of the locking holes 56a, which is shown in FIG. 16, until the first stopper part 37a of the wall part 37 of the operation member 31 comes into contact with the contacting and regulating member 42. As shown in FIG. 17, when the operation member 31 is swung until the first stopper part 37a of the wall part 37 is brought into contact with the contacting and regulating member 42, the projecting member 32 can be lifted above the bottom surface 57a of the recessed part 57, but cannot be lifted up to a position equal to the height of the bottom surface 55b of the guide groove 55. Thus, when the contacting and regulating member 42 is located on the first position pa1, the operation member 31 can be operated (moved) with an operation amount (moving amount) that is not less than the first operation amount of the operation member 31 required for sliding the seat body 20 between the plurality of reclining positions, but is less than the second operation amount of the operation member 31 required for sliding the seat body 20 from one of the plurality of reclining positions to the turning position.

On the other hand, when the contacting and regulating member 42 is located on the second position pa2, the operation member 31 can be swung from the initial condition shown in FIG. 16 until the second stopper part 37b of the wall part 37 of the operation member 31 comes into contact with the contacting and regulating member 42. As shown in FIG. 18, when the operation member 31 is swung until the second stopper part 37b of the wall part 37 is brought into contact with the contacting and regulating member 42, the projecting member 32 can be lifted above the bottom surface 55b of the guide groove 55. Thus, when the contacting and regulating member 42 is located on the second position pa2, the operation member 31 can be operated (moved) with an operation amount (moving amount) that is not less than the second operation amount of the operation member 31 required for sliding the seat body 20 from one of the plurality of reclining positions to the turning position.

As shown in FIGS. 21 and 22, the operation amount adjusting member 40 further includes a swingable holding lever 43 that extends above the movement path mr of the contacting and regulating member 42 from the first position pa1 to the second position pa2. The holding lever 43 is structured as a latchet mechanism that allows the movement of the contacting and regulating member 42 from the first position pa1 toward the second position pa2, and holds the contacting and regulating member 42 on the second position pa2 until the holding lever 43 is subjected to an external force so as to be swung to a position outside the movement path mr of the contacting and regulating member 42.

The holding lever 43 can be swung about a swinging axis line d4 that is perpendicular to the movement path mr of the contacting and regulating member 42 and is in parallel with the swinging axis d3 of the deregulating member 41. The holding lever 43 is urged by a not-shown torsion spring or the like in the direction shown by the arrow in FIG. 21. Namely, the holding lever 43 is urged so as to extend across the movement path mr of the contacting and regulating member 42. The holding member 43 has a guide surface 43a, which is inclined at a small angle with respect to the movement path mr from the first position pa1 of the contacting and regulating member 42 to the second position pa2 thereof, and a holding surface 43b, which extends substantially perpendicularly to the movement path mr from the first position pa1 of the contacting and regulating member 42 to the second position pa2 thereof. Thus, when the deregulating member 41 is operated so that the contacting and regulating member 42 is moved from the first position pa1 toward the second position pa2, the holding lever 43 is once swung to a position outside the movement path mr of the contacting and regulating member 42. Thus, only by operating the deregulating member 41, the contacting and regulating member 42 can be moved up to the second position pa2. When the contacting and regulating member 42 is moved to reach the second position pa2, the holding lever 43 extends on the movement path mr of the contacting and regulating member 42 by means of the urging force from the not-shown torsion spring. As a result, the holding surface 43b of the holding member 43 comes into contact with the contacting and regulating member 42 so as to regulate the movement of the contacting and regulating member 42. Thus, against the urging force to the operation member 31, the contacting and regulating member 42 is maintained on the second position pa2.

The holding lever 43 further includes a projecting part 43c projecting into the movement path of the operation member 31. On the other hand, the operation member 31 includes a disengaging part 38 which can be brought into contact with the projecting part 43c of the holding lever 43. When the operation member 31 is moved from a position (first disengagement position) at which the projecting member 32 is located after having moved, by the first operation amount, from the initial position at which the projecting member 32 is received in the locking hole 56a (position shown in FIG. 16), to a position (second disengagement position) at which the projecting member 32 is located after having moved from the initial position by the second operation amount, the disengaging member 38 of the operation member 31 is brought into contact with the projecting part 43c of the holding lever 43. As shown in FIG. 18, by the further swinging motion of the operation member 31, the disengaging member 38 presses the projecting part 43c so that the holding lever 43 is swung against the urging force to the position outside the movement path mr of the contacting and regulating member 42. After the holding lever 43 has been swung to the position outside the movement path mr of the contacting and regulating member 42, the contacting and regulating member 42 can be moved from the second position pa2 toward the first position pa1.

Each turning-position locking hole 56b is formed as a bottomed hole having a bottom. As shown in FIG. 19, when the projecting member 32 is inserted into the turning-position locking hole 56b, the projecting member 32 comes into contact with the bottom of the turning-position locking hole 56b. On the other hand, each locking hole 56a is formed as a bottomed hole (which is illustrated as an example) having a bottom that is located below the bottom of the turning-position locking hole 56b, or formed as a hole without bottom. As can be understood from the comparison between FIG. 19 and FIG. 16, the projecting member 32 inserted in the turning-position locking hole 56b is located above the position of the projecting member 32 that is inserted in the locking hole 56a. That is to say, when the projecting member 32 is inserted in the turning-position locking hole 56b, the projecting member 32 does not completely project from the guide piece 25 by the bottom of the turning-position locking hole 56b serving as a stopper, whereby the operation member 31 is not returned up to the initial position (position shown in FIG. 16). Thus, when the projecting members 32 are engaged with the turning-position locking holes 56b of the pedestal 50 so that the seat body 20 is fixed on the turning position, the operation member 31 is located on an intermediate position (position shown in FIG. 19, for example) between the second disengagement position (position shown in FIG. 18, for example) and the initial position (position shown in FIG. 16).

On the other hand, the operation member 31 further includes a third stopper part (stopper) 37c that is located, when the operation member 31 is located on the intermediate position, on (across) the movement path mr of the contacting and regulating member 42 on a position between the first position pa1 and the second position pa2 so as to regulate the movement of the contacting and regulating member 42 toward the first position. Specifically, as shown in FIG. 20, the third stopper part 37c is formed between the first stopper part 37a and the second stopper part 37b, as a surface extending from the wall part 37 toward the movement path mr along a direction perpendicular to the movement path mr of the contacting and regulating member 42. As can be understood from FIGS. 19 and 20, in this embodiment, unless the operation member 31 is substantially returned to the initial position, the contacting and regulating member 42 cannot pass the third stopper part 37c so as to be returned to the first position pa1.

Next, an operation of the projecting members (locking pins) 32 with the use of the lifting member 30 and the operation-amount adjusting mechanism 40 is described.

At first, operations of the lifting mechanism 30 and the operation-amount adjusting mechanism 40 when the reclining angle of the seat body 20 is varied are described. When the reclining angle of the seat body 20 is varied, the seat body 20 is moved from one reclining position to another reclining position. In this case, the operation member (operation lever) 31 of the lifting mechanism 30, which is in the initial position (position shown in FIG. 16), is swung as much as possible within the swingable range. In other words, the operation member 31 is swung to the position at which the contacting and regulating member 42 of the operation-amount adjusting mechanism 40, which is located on the first position pa1, is in contact with the first stopper part 37a of the operation member 31 so that further movement of the operation member 31 is regulated. As shown in FIG. 17, in accordance with the operation of the operation member 31, the distal end of the projecting member 32 exits from the locking hole 56a and is lifted above the bottom surface 57a of the recessed part 57. Thus, the seat body 20 can be slid with respect to the pedestal 50 until the projecting member 32 is located above another locking holes 56a. Due to the urging force of the tension spring 36 (see, FIGS. 10 and 11), when the external force is removed from the operation member 31, the projecting member 32 automatically projects from the guide piece 25. Thus, by engaging the projecting member 32 with another locking hole 56a, the seat body 20 can be reclined.

Next, operations of the lifting mechanism 30 and the operation-amount adjusting mechanism 40 when the seat body 20 is shifted from the forward facing condition to the backward facing condition are described. When the seat body 20 is shifted from the forward facing condition to the backward facing condition, the seat body 20 is moved from one reclining position to the turning position, and is then turned (reversed) by 180° on the turning position.

At first, by swinging the deregulating member 41 of the operation-amount adjusting mechanism 40, the contacting and regulating member 42 is moved from the first position pa1 to the second position pa2. Then, the operation member 31 of the lifting mechanism 30, which is in the initial position (position shown in FIG. 16), is swung as much as possible within the swingable range. In other words, the operation member 31 is swung to the position at which the contacting and regulating member 42 of the operation-amount adjusting mechanism 40, which is located on the second position pa2, is in contact with the second stopper part 37b of the operation member 31 so that further movement of the operation member 31 is regulated. As shown in FIG. 18, the distal end of the projecting member 32 exits from the locking hole 56a and is lifted above the bottom surface 55c of the guide groove 55. Thus, the movement of the seat body 20 to the turning position becomes possible.

As described above, when the seat body 20 is moved to the turning position, the connection pins 60 of the pedestal 50 are retracted into the standing part 52, and the connection guides 27 of the seat body 20 exit from the grooves 53. Thus, the turning motion of the seat body 20 with respect to the pedestal 50 becomes possible.

In addition, as described above, since the pair of turning-position locking holes 56b are offset from the front and back axis line cd, it is not until the seat body 20 is reversed that the projecting members 32 are opposed to the turning-position locking holes 56b. Thus, when the seat body 20 starts to move from any one of the reclining positions toward the turning position so that the projecting members 32 are opposed to the bottom surface 55c of the guide groove 55, the user may separate his/her hand from the operation member 31. When the seat member 20 takes the backward facing condition on the turning position, the projecting members 32 automatically enter the turning-position locking holes 56b, so that the seat body 20 can be fixed in the backward facing condition.

In this manner, the condition of the seat body 20 can be shifted from the forward facing condition to the backward facing condition.

According to this embodiment, an operation amount of the operation member 31 required for moving the seat body 20 from the reclining position to the turning position is larger than an operation amount of the operation member 31 required for moving the seat body 20 from one reclining position to another reclining position. That is to say, in order to move the seat body 20 to the turning position at which the seat body 20 can be turned, the operation member 31 must be operated with a larger operation amount. Thus, the seat body 20 can be efficiently prevented from being unintentionally moved to the turning position.

In particular, according to this embodiment, the step (difference) is formed between the surface 57a of the pedestal 50 in which the locking holes 56a are formed, and the surface 55c of the pedestal 50 in which the turning-position locking holes 56b are formed. By means of such a simple structure, the present invention can achieve that a lifting amount (retracting amount) of the projecting members 32, i.e., an operation amount of the operation member 31 from the initial position, which is required for moving the seat body 20 between the reclining positions differs from a lifting amount of the projecting members 32 which is required for moving the seat body 20 from the reclining position to the turning position.

In addition, according to this embodiment, the seat body 20 is provided with the operation-amount adjusting mechanism 40 having the contacting and regulating member 42 that can be positioned on the position pa1 at which the contacting and regulating member 42 is in contact with the operation member 31 so as to regulate the movement of the operation member 31, whereby an operation amount of the operation member 31 can be not less than the first operation amount but be less than the second operation amount. According to the operation-amount adjusting mechanism 40, the seat body 20 can be efficiently prevented from being unintentionally moved to the turning position.

In particular, according to this embodiment, the operation member 31 includes the wall part 37 that is structured as a lever swingable about an axis in parallel with the movement path mr of the contacting and regulating member 42. The wall part 37 can be brought into contact with and separated from the movement path mr in accordance with the swinging motion of the operation member 31. In addition, the wall part 37 has the projecting part and the recessed part along the movement path mr of the contacting and regulating member 42. Thus, by means of the simple operation, i.e., by moving the contacting and regulating member 42, the swingable (operable) range of the operation lever 31 from the initial position can be varied.

Further, according to this embodiment, once the deregulating member 41 is operated, the contacting and regulating member 42 can be maintained on the second position pa by the holding lever 43. Thus, the operation of the seat body 20 toward the turning position can be significantly facilitated, as well as the seat body 20 can be efficiently prevented from being unintentionally moved to the turning position.

Further, the deregulating member 41 is disposed in the vicinity of the operation member 31. Thus, it is very easy to operate the operation member 31 and the deregulating member 41 so as to move the seat body 20 to the turning position. In addition, since the deregulating member 41 is disposed in the vicinity of the operation member 31, when the seat body 20 is moved to the turning position, it can be efficiently prevented that the user fails to operate the deregulating member 41. Moreover, since the plane (vertical plane) including the operation direction of the operation member 31 and the plane (substantially horizontal plane) including the operation direction of the deregulating member 41 are perpendicular to each other, the operation direction of the operation member 31 and the operation direction of the deregulating member 41 are oriented differently from each other. More strictly, the swinging axis line d1 of the operation lever 31 and the swinging axis line d3 of the deregulating member 41 are substantially perpendicular to each other, whereby the operation direction (upward direction) of the operation lever 31 and the operation direction (substantially lateral direction) of the deregulating lever 41 are substantially perpendicular to each other. Thus, it can be efficiently prevented that the deregulating member 41 is accidentally operated when the operation member 31 is operated, or that the operation member 31 is accidentally operated when the deregulating member 41 is operated.

Next, operations of the lifting mechanism 30 and the operation-amount adjusting mechanism 40 when the seat body 20 is shifted from the backward facing condition to the forward facing condition. When the seat body 20 is shifted from the backward facing condition to the forward facing condition, the seat body 20 is turned (reversed) by 180° on the turning position, and is then moved from the turning position to one reclining position.

As described above, when the seat body 20 is moved from one reclining position to the turning position, the operation member 31 is swung as much as possible within the swingable range, with the contacting and regulating member 42 being located on the second position pa2. According to this operation, the disengaging part 38 of the operation member 31 presses the projecting part (projection for disengagement) 43c of the holding lever 43, so that the holding lever is swung to the position outside the movement path mr of the contacting and regulating member 420. Thus, due to the urging force via the deregulating member 41, the contacting and regulating member 42 is separated from the second position pa2 and is moved toward the first position pa1.

Figure 23:
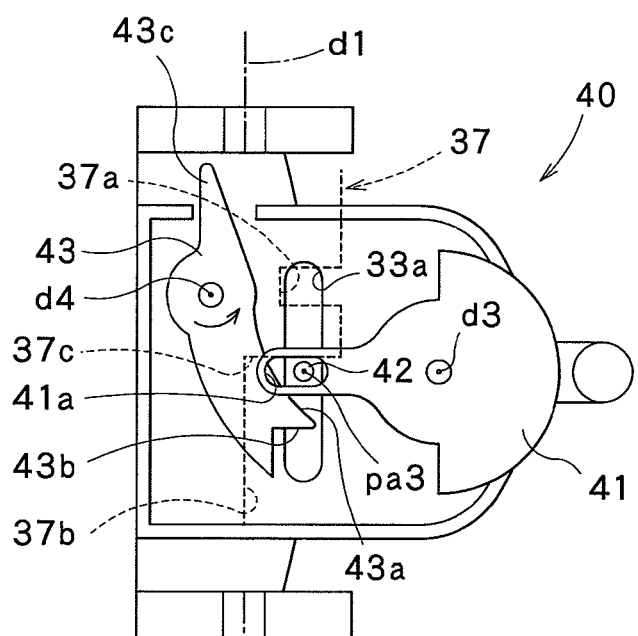
FIG. 23 is a plan view corresponding to FIGS. 21 and 22, for explaining the operations of the lifting mechanism and the operation-amount adjusting mechanism.

However, when the projecting member 32 is inserted in the turning-position locking hole 56b, the projecting member 32 is in contact with the bottom surface of the turning-position locking hole 56b. Thus, the operation member 31 is not returned up to the initial position (see, FIG. 16) but is located on the intermediate position (see, FIG. 19). As shown in FIG. 23, when the operation member 31 is located on the intermediate position, the third stopper part 37c is located above the elongated hole 33a of the support base 33 through which the contacting and regulating member 42 penetrates.

Thus, as shown in FIG. 23, when the seat body 20 is in the backward facing condition, the contacting and regulating member 42 is located on a position pa3 between the first position pa1 and the second position pa2. In the condition shown in FIG. 23, the operation member 31 of the lifting mechanism 30 can be swung until the contacting and regulating member 42 comes into contact with the wall part 37 at the second stopper part 37b. Thus, when the seat body 20 is in the backward facing condition, by operating the operation member 31 of the lifting mechanism 30, the projecting members 32 can exit from the turning-position locking holes 56b, without operating again the deregulating member 41 of the operation-amount adjusting mechanism 40. Therefore, the turning motion of the seat body 20 with respect to the pedestal 50 on the turning position, and the sliding motion of the seat body 20 with respect to the pedestal 50, become possible.

In the above manner, the condition of the seat body 20 can be shifted from the backward facing condition to the forward facing condition. As shown in FIG. 16, when the seat body 20 takes the forward facing condition and the projecting members 32 are inserted into any pair of the locking holes 56a, the operation member 31 is returned to the initial position. As shown in FIG. 21, in accordance with the return of the operation member 31 to the initial position, the contacting and regulating member 42 is moved up to the first position. Thus, when the seat body 20 is again shifted to the backward facing condition, it is necessary to operate the operation-amount adjusting mechanism 40, whereby the seat body 20 can be efficiently prevented from being unintentionally moved to the turning position, while the excellent operability is acquired.

[Fixation Onto Vehicle Seat]

Next, an operation for fixing the child car seat 10 (child car seat body 11) onto the vehicle seat 1 and structures relating thereto are described.

As described above, the child car seat 10 can be mounted on the vehicle seat 1 by fixing the pedestal 50 onto the vehicle seat 1 with the use of the seatbelt 5 provided on the vehicle seat 1. At this time, the base part 51 of the pedestal 50 is placed on the seat part 1a of the vehicle seat 1a, and the standing part 52 of the pedestal 50 is opposed to the back part 1b of the vehicle seat 1.

As shown in FIG. 3, the seat belt 5 includes the shoulder belt 6b extending downward obliquely, and the waist belt 6a extending laterally. In this embodiment, as described above, the standing part 52 of the pedestal 50 is provided with the lock-off devices 79 for clamping the shoulder belt 6b, and the standing part 52 of the pedestal 50 is fixed on the seat body 20 by the shoulder belt 6b. In addition, the pedestal 50 also has the waist-belt guide part 70 that guides the waist belt 6a. The waist-belt guide part 70 extends over the front surface 51a and the opposed side surfaces 51b of the base part 51 of the pedestal 50. In such a structure, as shown in FIG. 3, by connecting a movable buckle 6c, which is located on a position at which the shoulder belt 6b clamped by the lock-off devices 79 and obliquely traversing the standing part 52 and the waist belt 6a extending around the base part 51 are merged to each other, to a stationary buckle 6d fixed on the vehicle, the child car seat 10 can be placed on the vehicle seat 1.

Figure 24:
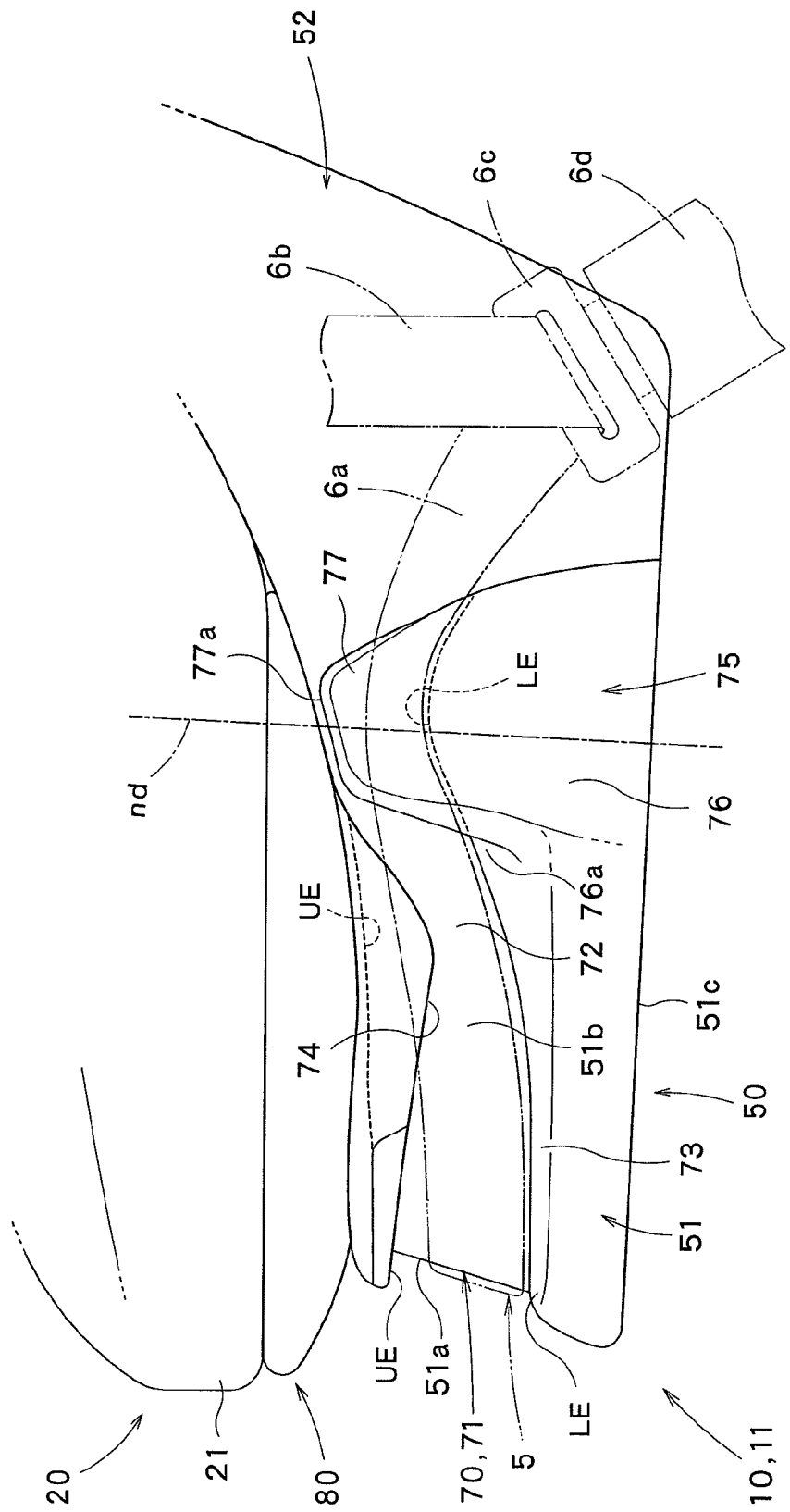
FIG. 24 is a partial side view showing the child car seat.
Figure 25:
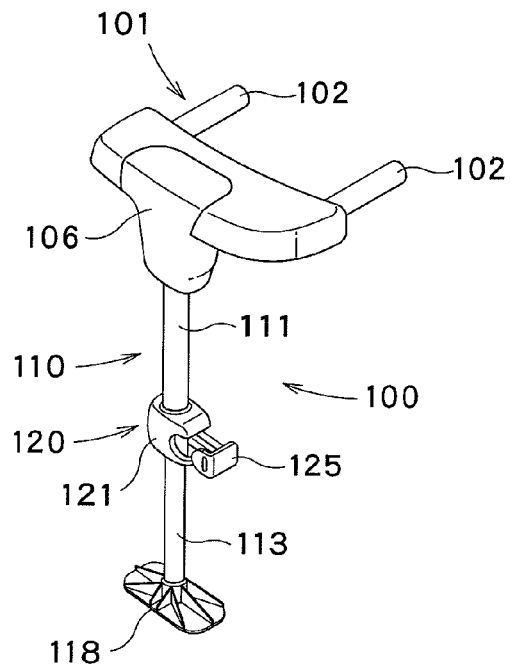
FIG. 25 is a perspective view showing a support leg.

Herebelow, the structure and the operation of the waist-belt guide part 70 are described in more detail. As shown in FIG. 24, the waist-belt guide part 70 includes a front guide part 71 extending on the front surface 51a of the base part 51, and side guide parts 72 continuous to the front guide part 71 and extending on the side surfaces 51 of the base part 51. The waist-belt guide part 70 is configured to guide the waist belt 6a on the base part 51. The front guide part 71 and the side guide part 72 are formed to have a groove-like shape as a whole. An upper edge UE defining the front guide part 71 and the side guide parts 72 from above, and a lower ledge LE defining the front guide part 71 and the side guide parts 72 from below, are substantially defined by steps (differences). According to such a waist-belt guide part 70, the waist belt 6a can be stably held at substantially a constant position. In this manner, by surrounding the base part 51 of the pedestal 50 by the waist belt 6a from the front surface 51a and the side surfaces 51b, the child car seat (child car seat body 11) can be stabilized, particularly in the front and back direction, on the vehicle seat 1.

As shown in FIGS. 9 and 24, the pedestal 50 further includes a pair of lateral guide members 75 respectively projecting outward in the lateral direction from the side surfaces 51b of the base part 51. Each of the lateral guide member 75 includes a laterally projecting part 76 laterally projecting from the side surface 51b of the base part 51, and an upwardly extending part 77 extending upwardly from the laterally projecting part 76. As shown in FIGS. 3, 24 and so on, the laterally projecting part 76 of the lateral guide member 75 forms at least a portion of the lower edge LE defining the side guide part 70 from below. The upwardly extending part 77 of the lateral guide member 75 is configured to regulate the laterally outward displacement of the waist belt 6a positioned on the side guide part 72.

As shown in FIG. 24, the lower edge LE of the side guide part 72 is located on an uppermost position in a part defined by the laterally projecting part 76 along a normal line nd relative to the bottom surface 51c of the base part 51, which is placed on the vehicle body 1. The laterally projecting part 76 of the lateral guide member 75 forms a portion of the lower edge LE of the side guide part 72, which is most distant from the front guide part 71, i.e., the most backward part of the lower edge LE.

According to this structure, when the waist belt 6a passes the lateral guide member 75 toward the connection point between the stationary buckle 6c and the movable buckle 6d, and when the waist belt 6a passes the lateral guide member 75 toward a starting point (fixing point to the vehicle) of the waist belt 6a, the waist belt 6a extends obliquely downward. Thus, the waist belt 6a not only presses backward the pedestal 50, i.e., the child car seat 10 onto the vehicle seat 1, but also presses downward the pedestal 50 (child car seat 10) onto the vehicle seat 1. Thus, the pedestal 50 (child car seat 10) can be fixed onto the vehicle seat 1 in a well-balanced manner.

In particular, it is preferable that a position of the lower edge LE of the side guide part 72 is gradually elevated along the normal line direction nd relative to the bottom surface 51c of the base part 51, as a point of the lower edge LE approaches from the connection position between the side guide part 72 and the front guide part 71 toward the part formed by the laterally projecting part 76. In this case, the waist belt 6a can extend in the side guide part 72 without trouble, and thus the waist belt 6a of the seat belt 5 can be made resistant to be detached from the waist-belt guide part 70. As shown in FIG. 24, it is more preferable that the side guide part 72 is formed as a groove that is substantially defined by steps (differences), and a stepped surface 73 forming the step is smoothly connected to an upper surface 76a of the laterally projecting part 76 of the lateral guide member 75. Thus, the waist belt 6a can extend in the side guide part 72 without any trouble, and thus the waist belt 6a can be made resistant to be detached from the waist-belt guide part 70.

In addition, as shown in FIG. 24, a width from the upper edge UE defining the side guide part 72 from above to the lower edge LE defining the side guide part 72 from below gradually narrows as a point of the width approaches the portion where the lower edge LE is formed by the laterally projecting part 76 from a side of the front surface 51a of the base part 51. According to this structure, the direction in which the waist belt 6a extends from the front to the back can be easily changed from the obliquely upward direction to the obliquely downward direction, in the upper surface 76a of the laterally projecting part 76 of the lateral guide member 75. Thus, the position of the waist belt 6a in the side guide part 72 can be stabilized, and the waist belt 6a can be made resistant to be detached from the waist-belt guide part 70.

As described above, the upwardly extending part 77 of the lateral guide member 75 is configured to regulate the waist belt 6a located on the side guide part 72 from being displaced laterally outward. Namely, according to the upwardly extending part 77, the displacement of the waist belt 6a from the side guide part 72 can be efficiently prevented, in an area in which the height of the lower edge LE along the normal line direction nd relative to the bottom surface 51c of the base part 51 becomes highest so that the inclination angle of the waist belt 6a varies, whereby the waist belt 6a is likely to be displaced. Thus, the pedestal 50 (child car seat 10) can be stably fixed onto the vehicle seat 1.

At least a portion of the upper edge UE defining the side guide part 72 from above is formed of a folded member 74 that projects laterally from the side surface 51b of the base part 51 and further extends downward. In particular, in this embodiment, in an area where the side projecting member 76 is formed and in the vicinity of this area, the folded member 74 is formed. Thus, in the area where the inclination angle of the waist belt 6a varies and in the vicinity of the area, the waist belt 6a can be held at substantially a constant position by the side guide part 72.

As shown in FIG. 24, it is preferable that a position of a top part 77a of the upwardly extending part 77 along the normal line direction nd relative to the bottom surface 51c of the base part 51 is located on the same height position as, or slightly lower than, a position along the normal line direction nd of the upper edge UE of the side guide part 72 in which the lower edge LE is formed by the laterally projecting part 76. In particular, in the illustrated example, the position of the top part 77a of the upwardly extending part 77 and the part of the upper edge UE of the side guide part 72, where the lower edge LE is formed by the laterally projecting part 76, are located on substantially the same position along the normal line direction nd. When the upwardly extending part 77 is formed as described above, the waist belt 6a can be efficiently prevented from escaping laterally outward, as well as the waist belt 6a can be easily set in the side guide part 72. Namely, the child car seat 10 can be easily mounted on the vehicle seat 1, and the child car seat 10 can be stably held on the vehicle seat 1.

[Support Leg]

Next, the support leg 100 and the structure of the child car seat body 11 relating to the support leg 100 are described.

The support leg 100 includes a fitting part 101 capable of being fitted in the pedestal 50, and a leg part 110 fixed on the fitting part 101 at a constant angle with respect to the fitting part 101.

Herein, the "constant angle" means that the extending direction of the leg part 110 with respect to the fitting part 101 cannot be varied. Thus, a structure in which the leg part 110 is swingable with respect to the fitting part 101 is excluded. However, some inevitable angle variation caused by a play among the respective members is omitted, and the angle between the leg part 110 with respect to the fitting part 101 is considered as constant.

As shown in FIG. 3, the support leg 100 is mounted on the pedestal 50 and extends between the floor surface 3 of the vehicle on which the vehicle seat 1 is installed, and the pedestal 50. As a result, the support leg 100 can support a front part of the child car seat body 11 mounted on the vehicle seat 1 from the floor surface 3. In order to assure versatility of the support leg 100 to vehicles, a length of the leg part 110 can be varied.

At first, the structure of the support leg 100 is described.

Figure 26:
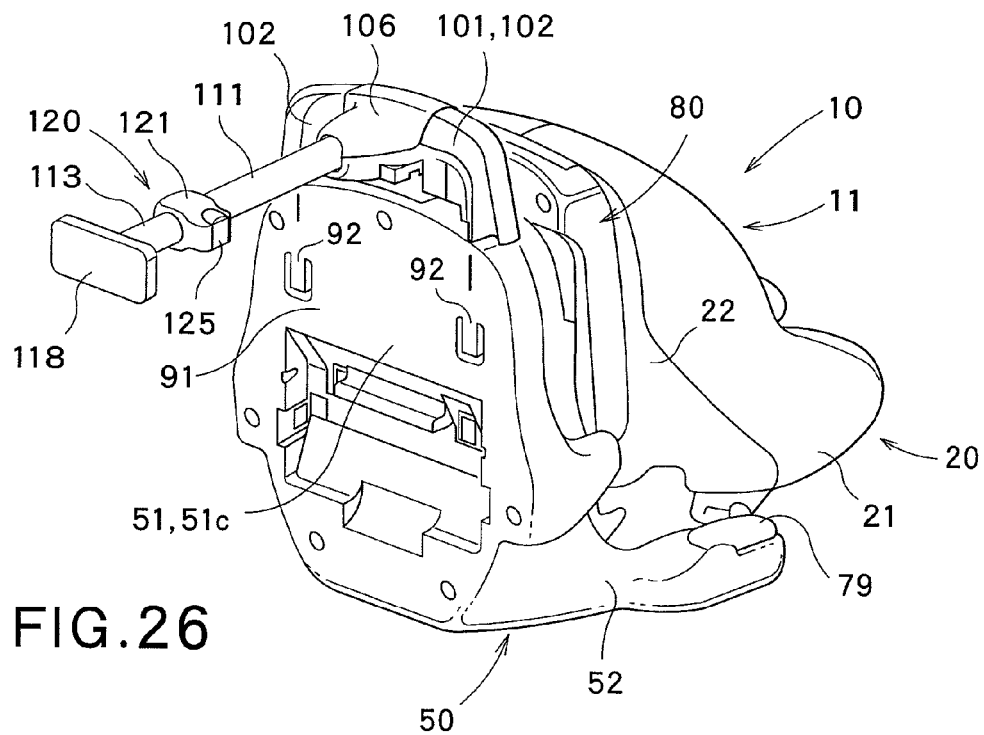
FIG. 26 is a perspective view showing the child car seat to which the support leg is attached, which is seen from the bottom side.
Figure 27:
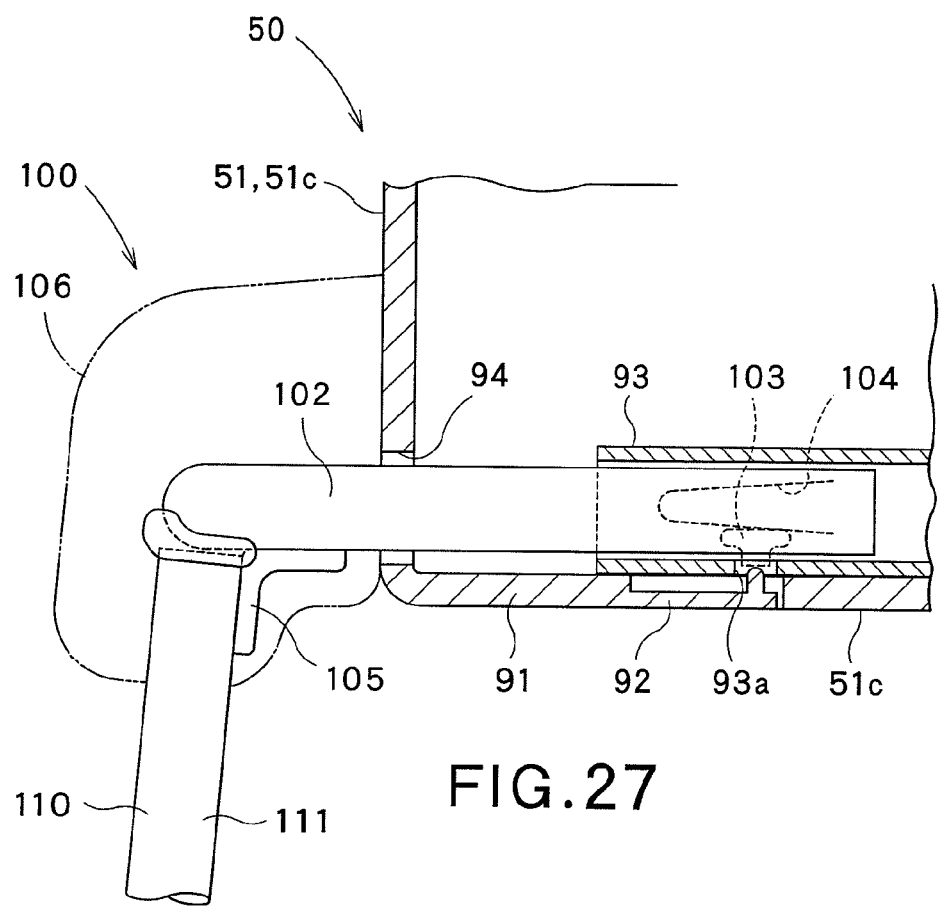
FIG. 27 is a sectional view schematically showing a connection portion between the support leg and the pedestal.
Figure 28:
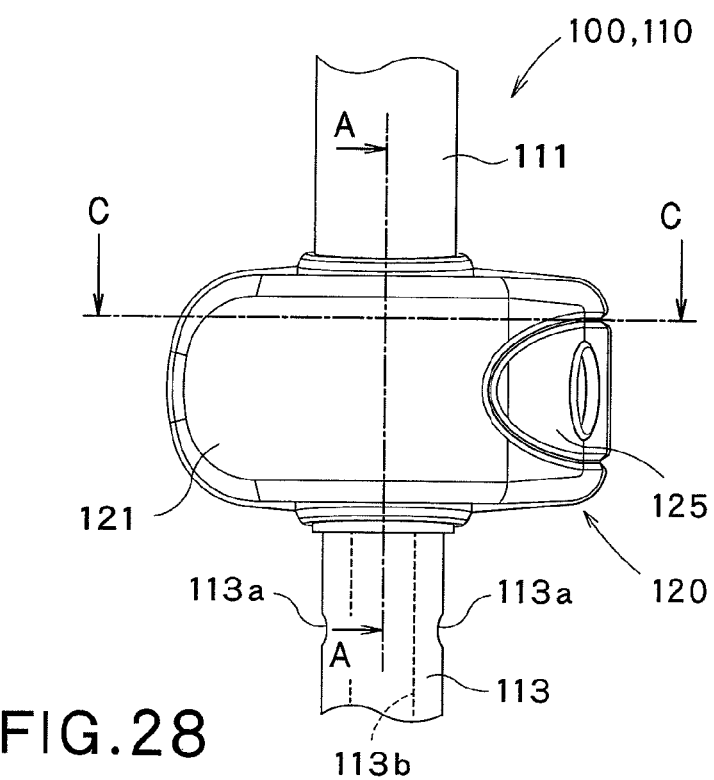
FIG. 28 is a partial front view showing a leg part of the support leg.

As can be understood from FIG. 26, the fitting part 101 includes a tubular member 102 formed to have a U-shape, in more detail, a metal cylindrical pipe. As shown in FIG. 27, the opposed ends of the tubular member 102 can be inserted into the pedestal 50 so as to be fitted in the pedestal 50. A through-hole is formed in a side surface of the tubular member 102 in an end area thereof. The tubular member 102 has therein a fitting projection 103 whose distal end projects from the through-hole. In addition, an urging member 104, such as a flat spring, is disposed in the tubular member 102. The urging member 104 presses the fitting projection 103 such that the fitting projection 103 is urged to project outward from the tubular member 102.

As shown in FIG. 27, the pedestal 50 further includes a bottom plate 91 forming the bottom surface 51c, and an accommodating member 93 fixed on the bottom plate 91 so as to accommodate the tubular member 102 of the fitting part 101. The accommodating member 93 is provided with a through-hole 93a capable of receiving the fitting projection 103 of the fitting part 101. The accommodating member 93 is formed of, e.g., a metal square pipe or a metal circular pipe. As shown in FIG. 1, the front surface 51a of the pedestal 50 is provided with insertion openings 94 through which the tubular member 102 of the fitting part 101 passes.

The bottom plate 91 has fitting disengaging members 92 disposed on positions opposed to the through-holes 93a of the accommodating member 93. When operated, the fitting disengaging member 92 can push the fitting projection 103 projecting into the through-hole 93a inside the accommodating member 93. As shown in FIG. 26, the fitting releasing part 92 is connected to a part of the bottom plate 91 other than the fitting releasing part 92 at a portion of an outer profile of the fitting releasing part 92. In a part other than the part of the outer profile, the fitting releasing part 92 is disconnected from the part of the bottom plate 91 other than the fitting releasing part 92. Thus, the fitting releasing part 92 is structured as a tongue-like part that is warped with respect to the part of the bottom plate 91 other than the fitting engaging part 92 so that the fitting releasing part 92 can be brought into contact with the fitting projection 103.

As shown in FIG. 27, the tubular member 102 of the fitting part 101 is connected to the leg part 110 at a constant angle via a reinforcing plate 105. The fitting part 101 and leg part 110 are secured to each other by welding. On the connection portion between the fitting part 101 and the leg part 110, a protective cover 106 for covering the connection portion is provided.

Next, the leg part 110 is described. The leg part 110 includes a first tubular member 111, a second tubular member 113 which can be slid with respect to the first tubular member 111, and a positioning mechanism 120 that fixes the second tubular member 113 relative to the first tubular member 111. One end of the first tubular member 111 is connected to the tubular member 102 of the fitting part 101, and the other end thereof is connected to the positioning mechanism 120. The second tubular member 113 is inserted into the first tubular member 111 from one end thereof. The second tubular member 113 is configured to be slidable in the first tubular member 111. A leg end 118 to be in contact with the floor surface 3 is disposed on the other end of the second tubular member 113.

Figure 29:
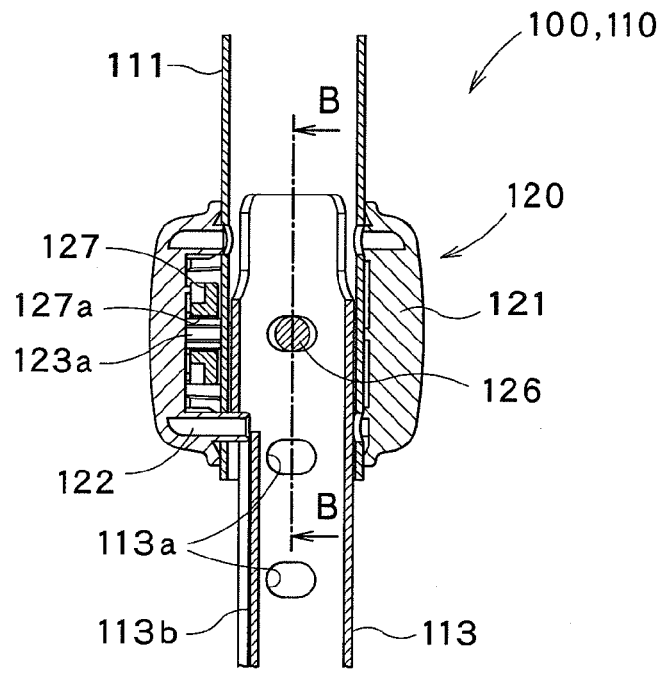
FIG. 29 is a view showing a section of FIG. 28 taken along the line A-A.
Figure 31:
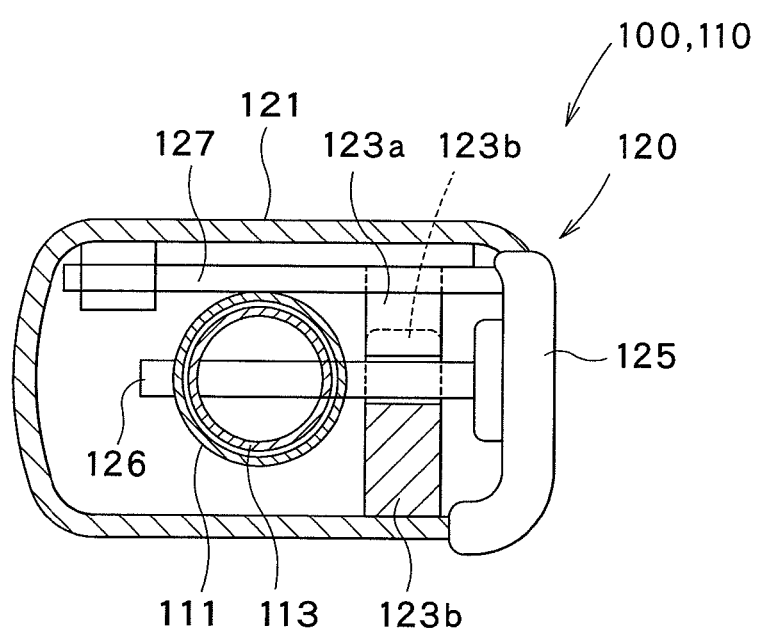
FIG. 31 is a view showing a section of FIG. 28 taken along the line C-C, with some constituent elements being omitted.

As shown in FIG. 31, both of the first tubular member 111 and the second tubular member 113 may be formed of a metal cylindrical pipes. A pair of holes 113a are formed in the second tubular member 113 in positions opposed to each other. Here, the plural pairs of holes 113a are formed with intervals therebetween in a sliding direction of the second tubular member 113 with respect to the first tubular member 111 (longitudinal direction of the second tubular member 113) (see, FIGS. 28 and 29). As shown in FIG. 29, each hole 113a is formed as an elongated hole that extends in a direction perpendicular to the sliding direction of the second tubular member 113 with respect to the first tubular member 111 (longitudinal direction of the second tubular member 113). In addition, the second tubular member 113 is provided with an elongated groove 113b for preventing rotation that extends in the sliding direction of the second tubular member 113 with respect to the first tubular member 111 (longitudinal direction of the second tubular member 113).

Figure 30:
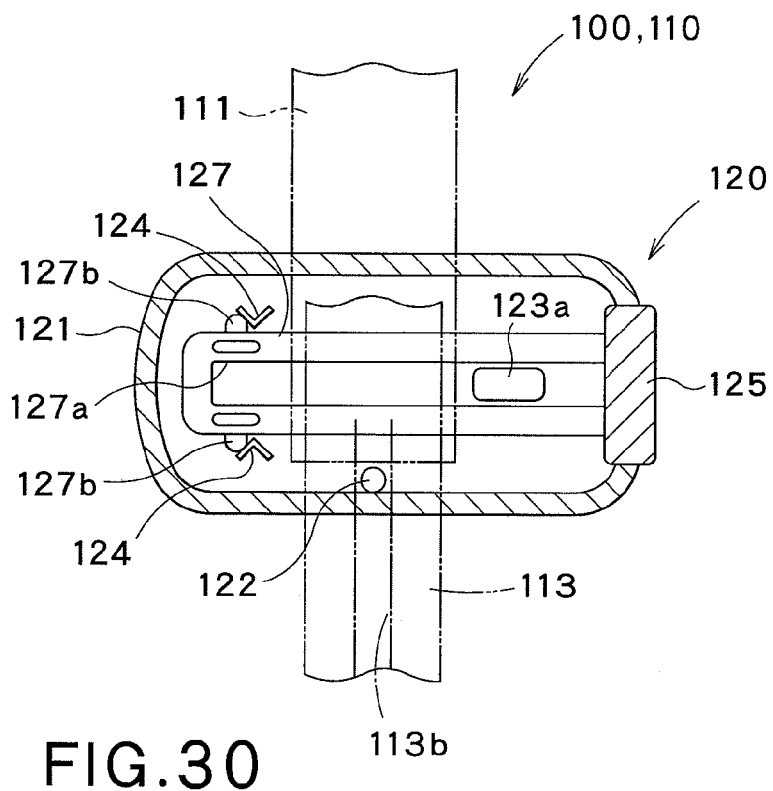
FIG. 30 is a view showing a section of FIG. 29 taken along the line B-B, with some constituent members being omitted.

On the other hand, the positioning mechanism 120 includes a housing 121 and a slider 125 that can be slid with respect to the housing 121. The other end of the first tubular member 111 is fixed to the housing 121. As shown in FIGS. 29 and 30, the housing 121 has a projection 122 for preventing rotation, which can be engaged with the groove 113b for preventing rotation of the second tubular member 113. Owing to the engagement between the groove 113b for preventing rotation and the projection 122 therefor, the rotation of the second tubular member 113 with respect to the housing can be prevented, whereby the holes 113a of the second tubular member 113 are opened in the same direction.

The slider 125 has a through-pin 126 that extends along the sliding direction with respect to the housing 121. When the slider 125 enters the housing 121, the through-pin 126 can pass through one pair of the plural pairs of elongated holes 113a so as to penetrate through the second tubular member 113. When the through-pin 126 penetrates through the second tubular member 113, the second tubular member 113 can be fixed onto the first tubular member 111.

As shown in FIGS. 29 to 31, the slider 125 further includes a slide guide member 127 that extends along the sliding direction with respect to the housing 121. Formed in the slide guide member 127 is an elongated hole 127a that extends along a longitudinal direction of the slide guide member 127. On the other hand, the housing 121 is provided with a first guide projection 123a extending through the elongated hole 127a of the slide guide member 127, and a second guide projection 123b disposed so as to be opposed to the first guide projection 123a. As shown in FIG. 31, the first guide projection 123a is opposed to the through-pin 126 of the slider 125 from one side. In addition, the second guide projection 123b surrounds the through-pin 126 from three sides. In such a structure, when the first guide projection 123a and the second guide projection 123b of the housing 121, and the through-pin 126 and the slide guide member 127 of the slider 125, are engaged with each other, the slider 125 can be slid with respect to the housing 121 only in one direction.

As shown in FIG. 30, engagement projections 127b are formed on the slide guide member 127, and engagement parts 124 engageable with the engagement projections 127b are formed on the housing 121. When the engagement projections 127b of the slide guide member 127 and the engagement parts 124 of the housing 121 are engaged with each other, the through-pin 126 is held so as to penetrate through the second tubular member 113. However, the engagement between the engagement projections 127b of the slide guide member 127 and the engagement parts 124 of the housing 121 can be easily disengaged by applying an external force for drawing the slider 125 out of the housing 121 along the sliding direction of the slider 125.

In this embodiment, as shown in FIG. 30, the engagement part 124 is formed as a projection extending from the housing 121. The engagement part 124 is elastically deformable, so that the engagement projection 127b of the slide guide member 127 can be moved over the engagement part 124. Since the engagement projection 127b that has once moved over the engagement part 124 is engaged with the engagement part 124, the through-pin 126 is maintained so as to penetrate through the second tubular member 113 until an external force is applied to the slider 125.

In a cross-section in parallel with the sliding direction of the slider 125, the cross-section being in parallel with the projecting direction of the engagement projection 127b from the slide guide member 127 (i.e., the cross-section shown in FIG. 30), the engagement part 124 has a V shape so as to guide the movement of the engagement projection 127b along the sliding direction of the slider 125. Thus, the engagement projection 127b can be smoothly engaged with the engagement part 124, so that the operation of the slider 125 can be stably performed.

Next, the operation of the support leg 100 as structured above is described. At first, a case in which the support leg 100 is mounted on the pedestal 50 is described.

When the support leg 100 is mounted on the pedestal 50, the ends of the tubular member 102 of the fitting part 101 are inserted and pushed into the insertion openings 94 of the pedestal 50. As a result, the end region of the tubular member 102 is inserted into the cylindrical accommodating member 93 disposed in the base part 51 of the pedestal 50. Finally, the fitting projection 103 urged to project from the tubular member 102 is received in the through-hole 93a of the accommodating member 93. In this manner, the fitting part 101 of the support leg 100 is fitted in the pedestal 50, so that the support leg 100 is mounted on the child car seat body 11

According to the support leg 100, since the leg part 110 is fixed on the fitting part 101 such that a constant angle is defined with respect to the fitting part 101, the rigidity of the support leg 100 is remarkably improved. Thus, the child car seat body 11 of the child car seat, i.e., the pedestal 50 and the seat body 20 can be stably held on the vehicle seat 1.

In addition, in the positioning mechanism 120 for fixing the second tubular member 113 onto the first tubular member 111, the through-pin 126 of a circular cross-section of the slider 125 penetrates through the pair of holes 113a formed in the opposed positions of the second tubular member 113. That is to say, since the through-pin 126 penetrates through the second tubular member 113, the second tubular member 113 can be securely fixed on the first tubular member 111. Thus, the child car seat 10 (the pedestal 50 and the seat body 20) can be more stably held on the vehicle seat 1.

Since the fitting part 101 and the leg part 110 are fixedly and highly rigidly connected to each other, there is a possibility that an outer force might be intensively applied to the positioning mechanism 120 having the movable member. However, as described above, since the through-pin 126 penetrates through the second tubular member 113 via the pair of holes 113a so that the second tubular member 113 is securely fixed onto the first tubular member 111, there is no problem.

Although the through-pin 126 must penetrate through the pair of holes 113a formed in the second tubular member 113, the pair of holes 113a are formed as elongated holes such that a cross-sectional area of the hole 113a is larger than a required area through which the through-pin 126 penetrates. Thus, it is easy to operate the slider 125 so as to allow the through-pin 126 to penetrate through both of the through-holes 113. Thus, length adjustment of the leg part 110 with the use of the positioning mechanism 120 can be easily performed.

Meanwhile, the elongated hole 113a of the second tubular member 113 does not extend in the sliding direction of the second tubular member 113 with respect to the first tubular member 111 (longitudinal direction of the second tubular member 113). Thus, after the through-pin 126 has penetrated through the second tubular member 113, the leg part 110 can be maintained a constant length. On the other hand, the elongated hole 113a of the second tubular member 113 extends in the direction perpendicular to the sliding direction of the second tubular member 113 with respect to the first tubular member 111 (longitudinal direction of the second tubular member 113). However, the groove 113b for preventing rotation, which is formed in the second tubular member 113, and the projection 122 for preventing rotation, which is formed on the housing 121, are engaged with each other. Thus, the second tubular member 113 and the through-pin 126 can be prevented from relatively moving to each other in the longitudinal direction of the elongated hole 113a.

Further, since the second tubular member 113 is securely fixed onto the first tubular member 111, the housing 121 can be prevented from being largely deformed. Thus, it is sufficient that the housing 121 and the slider 125 are locked with each other by a simple mechanism. For example, as described above, the slider 125 and the housing 121 may be engaged with each other such that the slider 125 and the housing 121 can be disengaged from each other by applying an external force in the sliding direction of the slider 125, and the through-pin 126 is maintained to penetrate through the second tubular member 113. To be more specific, the following structure is possible. Namely, a projection is formed on one of the slider 125 and the housing 121, and an engagement part engageable with the projection is formed on the other of the slider 125 and the housing 121. When the projection and the engagement part are engaged with each other, the through-pin 126 can be held to penetrate through the second tubular member 113. In the example shown in FIG. 30, the engagement part is formed as the projection having a V-shaped cross-section. However, not limited thereto, the engagement part may be formed as a recess for receiving the engagement projection 127b.

Next, a case in which the support leg 100 is removed from the pedestal 50 is described. In this case, the fitting disengagement part 92 formed of a part of the bottom plate 91, typically formed of a resin, is pressed. By this operation, the fitting projection 103 is pressed into the accommodating member 93, and the fitting part 101 can be withdrawn from the inside of the pedestal 50 while gripping the protective cover 106, for example. In this manner, the support leg 100 can be detached from the pedestal 50 (child car seat body 11). Thus, without touching the accommodating member 93 which may be formed of a metal pipe or the like, and without touching the tubular member 102 and the fitting projection 103 of the fitting part 101 which may be made of metal, the fitting state of the fitting part 101 in the pedestal 50 can be released so that the support leg 100 can be detached from the pedestal 50 (child car seat 10). Thus, the support leg 100 can be removed from the pedestal 50 (child car seat 10) at ease.

Although the one embodiment of the present invention is described hereabove, the present invention can be naturally, variously modified within the scope of the present invention.

The invention claimed is:
1. A child car seat comprising:
a pedestal to be mounted on a seat of a vehicle, the pedestal including a base part having a front surface, side surfaces and a bottom surface, and a standing part standing from the base part; and
a seat body supported on the pedestal;
wherein the pedestal includes a waist-belt guide part for guiding a waist belt of a seatbelt provided on the seat of the vehicle, the waist-belt guide part including a front guide part extending on the front surface of the base part, and side guide parts continuous to the front guide part and extending on the side surfaces of the base part, said waist-belt guide part including an upper edge and a lower edge defining the front guide part and the side guide parts;
the pedestal further includes a lateral guide member having a laterally projecting part laterally projecting outward from the side surface of the base part, and an upwardly extending part extending upwardly from the laterally projecting part; and the laterally projecting part of the lateral guide member forms at least a portion of the lower edge.

2. The child car seat according to claim 1, wherein said portion of the lower edge formed by the laterally projecting part is located on an uppermost position along a vertical central axis, relative to the bottom surface of the base part.

3. The child car seat according to claim 1, wherein said lower edge extends upward along the vertical central axis from a side of the front surface of the base part toward said portion of the lower edge formed by the laterally projecting part.

4. The child car seat according to claim 1, wherein said portion of the lower edge formed by the laterally projecting part is most distant from the front guide part relative to other portions of the lower edge defining the side guide part.

5. The child car seat according to claim 1, wherein:
the side guide part is formed as a groove at least a lower edge of which is defined by a step; and
a stepped surface forming the step is smoothly connected to the laterally projecting part of the lateral guide member forming a portion of the lower edge.

6. The child car seat according to claim 1, wherein
a position of a top part of the upwardly extending part along a vertical central axis relative to the bottom surface of the base part is located on the same height position as, or slightly lower than, a position, along the vertical central axis, of the upper edge defining the side guide part in which the lower edge is formed by the laterally projecting part.

7. The child car seat according to claim 1, wherein
at least a portion of the upper edge defining the side guide part from above is formed of a folded member that projects laterally from the side surface of the base part and then extends downward.

8. The child car seat according to claim 1, wherein
a width from the upper edge defining the side guide part to the lower edge defining the side guide part gradually narrows from a side of the front surface of the base part to said portion of the lower edge formed by the laterally projecting part.

9. A child car seat comprising:
a pedestal to be mounted on a seat of a vehicle, the pedestal including a base part, and a standing part standing from the base part; and
a seat body supported on the pedestal so as to be slidable with respect to the pedestal;
wherein:
the seat body includes a seat part and a backrest part connected to the seat part;
the backrest part is provided with a connection guide that can pass through a groove formed in the standing part when the seat body is slid;
the connection guide includes a proximal part extending from the backrest part, and a bent part extending from the proximal part in a bent manner;
the groove formed in the standing part extends in a bent manner correspondingly to the shape of the connection guide, in a cross-section perpendicular to a moving direction of the connection guide when the seat body is slid;
the seat body can be slid with respect to the pedestal up to a turning position at which the seat body can be turned on the pedestal;

both of a portion of the groove for accommodating the proximal part and a portion of the groove accommodating the bent part are opened in an end surface of the standing part; and
the connection guide is configured to exit the groove in the end surface of the standing part, when the seat body reaches the turning position, whereby the seat body can be turned on the pedestal.

10. The child car seat according to claim 9, wherein
a direction in which the proximal part of the connection guide extends, and a direction in which the bent part extends from the proximal part, are substantially perpendicular to each other, in the cross-section perpendicular to the moving direction of the connection guide when the seat body is slid.

11. The child car seat according to claim 9, further comprising a cover to be detachably attached to the standing part that is exposed by the movement of the backrest part when the seat body is turned on the pedestal,
wherein, when the cover is attached to the standing part, the cover covers the groove opening in the end surface of the standing part.

12. The child car seat according to claim 9, wherein:
the standing part of the pedestal is provided with a lock-off device for holding a shoulder belt of a seatbelt provided on the seat of the vehicle; and
when the cover is attached to the standing part, the cover covers the lock-off device and the shoulder belt that is held by the lock-off device and that extends on the standing part.

13. The child car seat according to claim 9, wherein:
the backrest part is provided with the connection guide on one side and the connection guide on the other side, which are disposed apart from each other in a lateral direction;
the bent part of the connection guide on one side is bent from the proximal part toward one side of the lateral direction, and the bent part of the connection guide on the other side is bent from the proximal part toward the other side of the lateral direction;
formed in the standing part are: the groove on the one side to be engaged with the connection guide on the one side, and the groove on the other side to be engaged with the connection guide on the other side; the groove on the one side and the groove on the other side being apart from each other in the lateral direction; and the groove on the one side and the groove on the other side are opened in the end surface of the standing part;
the cover is provided, in an area of a surface that is exposed when the cover is attached to the standing part, the area being positioned on the end surface when the cover is attached to the standing part, with a sheet-like member on one side and a sheet-like member on the other side which are away from each other in the lateral direction;
the sheet-like member on the one side is opened to the one side in the lateral direction, and the sheet-like member on the other side is opened to the other side in the lateral direction; and
when the sheet body is turned without the cover being detached, the connection guide on the other side is caught by an opening portion of the sheet-like member on the one side, or the connecting guide on the one side is caught by an opening portion of the sheet-like member on the other side.

14. The child car seat according to claim 1, wherein said portion of the lower edge is formed between the side surfaces of the base part and the upwardly extending part.

\* \* \* \* \*